US009278319B2

(12) United States Patent
Hoek et al.

(10) Patent No.: US 9,278,319 B2
(45) Date of Patent: Mar. 8, 2016

(54) MEMBRANE COMPOSITIONS AND METHODS FOR MAKING AND USING THEM

(75) Inventors: Eric M. V. Hoek, Los Angeles, CA (US); Gregory R. Guillen, Yucaipa, CA (US); Richard B. Kaner, Pacific Palisades, CA (US); Thomas P. Farrell, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 917 days.

(21) Appl. No.: 13/139,263

(22) PCT Filed: Dec. 11, 2009

(86) PCT No.: PCT/US2009/067628
§ 371 (c)(1),
(2), (4) Date: Jun. 10, 2011

(87) PCT Pub. No.: WO2010/068839
PCT Pub. Date: Jun. 17, 2010

(65) Prior Publication Data
US 2011/0240556 A1    Oct. 6, 2011

Related U.S. Application Data

(60) Provisional application No. 61/121,672, filed on Dec. 11, 2008.

(51) Int. Cl.
*B01D 39/00* (2006.01)
*B01D 39/14* (2006.01)
(Continued)

(52) U.S. Cl.
CPC ............ *B01D 71/58* (2013.01); *B01D 67/0011* (2013.01); *C08G 73/0266* (2013.01);
(Continued)

(58) Field of Classification Search
CPC ............ C08L 81/06; H01B 1/12; C02F 1/00; C02F 2103/08; C02F 1/44; C02F 1/441; C02F 1/4693; C02F 2001/46133; C08G 73/02
USPC ............ 210/500.37, 500.41, 500.23, 500.27, 210/321.6, 321.8; 525/535; 252/500; 528/422; 264/41, 456
See application file for complete search history.

(56) References Cited

U.S. PATENT DOCUMENTS

| 5,096,586 A | 3/1992 | Kaner et al. |
| 5,234,453 A * | 8/1993 | Smith et al. ................... 606/170 |

(Continued)

FOREIGN PATENT DOCUMENTS

| CN | 101274221 | 10/2008 |
| DE | 19916802 | 10/2001 |

(Continued)

OTHER PUBLICATIONS

Extended European Search Report dated Mar. 21, 2013 for European Patent Application No. 09832594.7.
(Continued)

*Primary Examiner* — Ana Fortuna
(74) *Attorney, Agent, or Firm* — Foley Hoag LLP; David P. Halstead; Janine S. Ladislaw

(57) ABSTRACT

By modifying existing methods for synthesizing polyaniline, a polyaniline polymer having a new constellation of material properties has been produced. The material properties of the polymeric compositions disclosed herein enhance the use of polyanilines in a wide variety of processes that use such materials, for example processes used in the formation of filtration membranes.

20 Claims, 29 Drawing Sheets

(51) Int. Cl.
*B29C 65/00* (2006.01)
*B01D 71/58* (2006.01)
*B01D 67/00* (2006.01)
*C08G 73/02* (2006.01)
*C08L 79/02* (2006.01)
*C08L 81/06* (2006.01)

(52) U.S. Cl.
CPC ............ *C08L 79/02* (2013.01); *B01D 2323/02* (2013.01); *B01D 2323/08* (2013.01); *B01D 2325/26* (2013.01); *C08L 81/06* (2013.01); *C08L 2205/02* (2013.01)

(56) References Cited

U.S. PATENT DOCUMENTS

| | | | |
|---|---|---|---|
| 6,429,282 B1* | 8/2002 | Wang et al. | 528/422 |
| 7,160,575 B1* | 1/2007 | Pinto et al. | 427/245 |
| 7,510,658 B2* | 3/2009 | Gordon | 210/652 |
| 7,535,019 B1* | 5/2009 | Sager et al. | 257/43 |
| 7,601,263 B2* | 10/2009 | Ebert et al. | 210/651 |
| 8,101,709 B1* | 1/2012 | Kaner et al. | 528/377 |
| 8,470,203 B2* | 6/2013 | Kaner et al. | 252/500 |
| 8,664,357 B2* | 3/2014 | Livingston et al. | 530/335 |
| 2003/0162939 A1 | 8/2003 | Wang et al. | |
| 2007/0108420 A1* | 5/2007 | Kuramoto | 252/500 |
| 2008/0185294 A1 | 8/2008 | Cai et al. | |
| 2008/0203012 A1* | 8/2008 | Yeager et al. | 210/500.36 |
| 2010/0025892 A1* | 2/2010 | Jones et al. | 264/456 |
| 2010/0307974 A1* | 12/2010 | Pettinger et al. | 210/650 |
| 2011/0287551 A1* | 11/2011 | Weiller et al. | 436/103 |
| 2012/0248031 A1* | 10/2012 | Kerres et al. | 210/500.28 |
| 2012/0255897 A1* | 10/2012 | Lu et al. | 210/321.6 |

FOREIGN PATENT DOCUMENTS

| | | |
|---|---|---|
| KR | 1020000000662 | 1/2000 |
| WO | 9744121 | 11/1997 |

OTHER PUBLICATIONS

PCT International Search Report and Written Opinion dated Jul. 13, 2010 (PCT Application No. PCT/US2009/067628).

* cited by examiner

FIG. 2A

| Conductive Polymer | Repeating Unit | Dopants | Conductivity* (S cm⁻¹) |
|---|---|---|---|
| *trans*-polyacetylene | | I₂, Br₂, Li, Na, AsF₅ | 10⁴ |
| Poly(3-alkyl-thiophene) | | BF₄⁻, ClO₄⁻, FeCl₄⁻ | 10³ – 10⁴ |
| Polyaniline† | | HCl | 200 |
| Polyisothianaphthalene | | BF₄⁻, ClO₄⁻ | 50 |
| Poly(*p*-phenylene) | | AsF₅, Li, K | 10³ |
| Poly(*p*-phenylene vinylene) | | AsF₅ | 10⁴ |
| Polypyrrole | | BF₄⁻, ClO₄⁻, tosylate‡ | 500–7500 |
| Polythiophene | | BF₄⁻, ClO₄⁻, tosylate,‡ FeCl₄⁻ | 10³ |

\* Approximate maximum conductivity of doped polymer.
† Polyaniline exists in four oxidation states, of which only the emeraldine salt,

is a good conductor requiring only protonic doping of the imine nitrogen as shown.
‡ *p*-Methylphenylsulfonate.

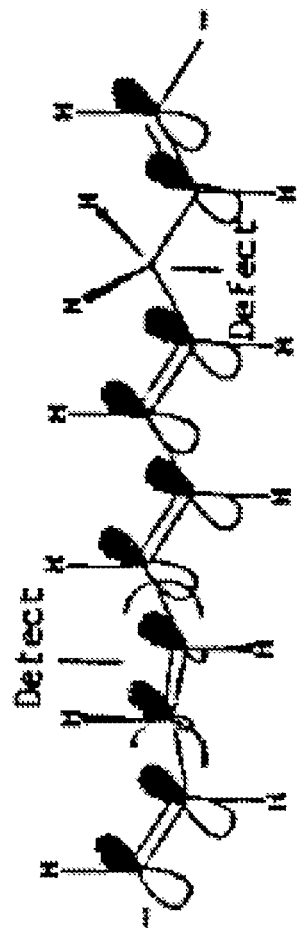
FIG. 2B
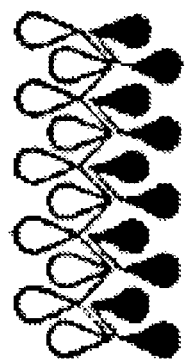

MEMBRANE COMPOSITIONS AND METHODS FOR MAKING AND USING THEM

CROSS REFERENCE TO RELATED APPLICATIONS

This application claims priority under Section 119(e) from U.S. Provisional Application Ser. No. 61/121,672 filed Dec. 11, 2008, the contents of which are incorporated herein by reference.

BACKGROUND OF THE INVENTION

1. Field of the Invention

This invention relates to compositions useful for making filtration membranes, for example those used to separate materials in fluids.

2. Background

Freshwater scarcity, widespread pollution, and stricter governmental regulations have created an increased need for the development of advanced water treatment technologies including fluid separation processes. Fluid separation processes are also widely used in a variety of academic and industrial environments. Consequently, compositions, devices and associated techniques that facilitate the efficient separation of components in fluid mixtures have an expanding variety of applications. For these reasons, improved materials and techniques for the separation of components of fluid mixtures are highly desirable.

Filtration is a common separation technology that is typically used to remove constituents such as particulates (e.g. organisms, colloidal matter and the like) from fluids. Two basic filter types exist: media (depth) filters and membrane (sieving) filters. Media filters are a well established technology for use in water purification which typically rely on cheap, natural media such as sand, anthracite, crushed magnetite, garnet, etc. to treat wastewater (see, e.g. Droste, Theory and practice of water and wastewater treatment. 1997, John Wiley & Sons, Inc.: New York, N.Y. p. 416-451). While membrane filtration also has been used to purify drinking water for over 50 years, the vast majority of modern water and wastewater treatment plants continue to use granular media filters.

Granular media filters have limitations in a number of contexts. For example, particle removal in depth filters is limited by the effectiveness of coagulation. Moreover, as the media in such systems is not fixed within the filter bed, the presence of some contaminating constituents in such systems can occur. Contaminations of drinking water such as the Cryptosporidium protozoan outbreak in Milwaukee in 1993 have resulted in epidemics of waterborne disease that highlighted this Achilles heel of media filtration, i.e. their intrinsically poor removal of particles in the micrometer size range especially when coagulation is sub-optimal (see, e.g., Corso et al., 2003, 9, 426-431). Such contamination events have forced public health officials and the water industry to consider replacing granular media filters with membrane filtration, which (relative to media filtration) can offer an enhanced barrier to a wide variety of contaminants. In addition, in other types of separation processes, membranes offer a greater ability to selectivity tailor filtration characteristics by, for example, modifying the surface pore structure and surface chemistry.

In view of the wide variety of technologies in which the use of membranes for the separation of components in a fluid medium is desirable, there is a need in the art for membrane materials having enhanced properties that optimize their use in such contexts.

SUMMARY OF THE INVENTION

Polyaniline compositions exhibit characteristics that make them suitable for use in filtration membranes, for example filtration membranes used in the separation of fluid constituents. By modifying existing methods for synthesizing polyaniline, polyaniline polymers having a new constellation of material properties have been formed. The material properties of these polymeric compositions enhance their use in a variety of processes, in particular processes used in the formation of filtration membranes. As discussed in detail below, illustrative embodiments of the invention include polyaniline compositions having unique material properties (e.g. an enhanced solubility) and membranes made from such compositions. Embodiments of the invention further include fluid separation systems adapted to use such membranes as well as methods for the separation of fluid components using such membranes and/or systems.

The invention disclosed herein has a number of embodiments. One embodiment of the invention is a method of making polyaniline compositions having unique material properties (e.g. solubility profiles). Typically such methods comprise combining aniline monomers and an aniline polymer initiator together in a single step so as to form an oxidative polymerization reaction; and then subjecting the oxidative polymerization reaction to a mechanical force during the oxidative polymerization reaction, wherein the mechanical force is sufficient to disrupt a nucleation process of a polyaniline polymer formed by the oxidative polymerization reaction. In certain embodiments of the invention, the oxidative polymerization reaction proceeds at room temperature and forms high defect density polyaniline polymers having a high proportion of polymer bonds at meta and/or ortho position moieties on aniline rings as compared to polyaniline polymers formed in an oxidative polymerization reaction where the initiator is added in a stepwise manner. Typically the polymerization processes disclosed herein form polyaniline polymers having a decreased ability to form the interchain hydrogen bonding interactions in a solvent as compared to polyaniline polymers made by conventional polymerization processes.

Another embodiment of the invention is a composition of matter comprising a plurality of polyaniline polymers, wherein the plurality of polyaniline polymers have an average molecular weight of between 1,000 and $1 \times 10^6$ Daltons; and at concentration of at least 11 weight %, the plurality of polyaniline polymers form a dispersion in a 2-methyl-pyrrolidone (NMP) solvent in the absence of a cosolvent. Typically such polyaniline compositions further comprise one or more additional agents selected to modulate the material properties of the composition, for example a hydrophilic agent that contributes to the hydrophilicity of the composition or a doping agent that contributes to the electrical conductivity of the composition. In one illustrative embodiment, a composition of the invention comprises a mixture of polyaniline polymers and hydrophilic polymers such as polyethylene polymers. In another illustrative embodiment, a composition of the invention comprises polyaniline polymers doped with an acid such as $H_2SO_4$. In yet another illustrative embodiment, a composition of the invention comprises a mixture of polyaniline polymers and polysulfone polymers, wherein the polysulfone polymers have an average molecular weight of between 1,000 and $1 \times 10^6$ Daltons. Related embodiments of the invention include methods for making filtration membranes from these compositions as well as the filtration membranes formed from these compositions.

Yet another embodiment of the invention is a fluid separation system comprising a first contained fluid environment; a first fluid conduit in operable contact with the first contained fluid environment to allow fluid movement between the first contained fluid environment and a first external reservoir; a second contained fluid environment; a second fluid conduit in operable contact with the second contained fluid environment to allow fluid movement between the second contained fluid environment and a second external reservoir. These fluid separation systems further include a filtration membrane disposed between the first contained fluid environment and the second contained fluid environment so as to form a permeable barrier between a fluid in the first contained fluid environment and a fluid the second contained fluid environment. In such fluid separation systems, the membrane is formed from a composition of matter comprising a plurality of polyaniline polymers, wherein the plurality of polyaniline polymers have an average molecular weight that is between 1,000 and $1 \times 10^6$ Daltons; and at concentration of at least 11 weight %, the plurality of polyaniline polymers form a dispersion in a 2-methyl-pyrrolidone (NMP) solvent in the absence of a cosolvent. In these fluid separation systems, this membrane is designed to exhibit a selective permeability so as to allow solutes of a first size to diffuse between fluids in the first and second contained fluid environments while simultaneously inhibiting solutes of a second size from diffusing between fluids in the first and second contained fluid environments. In this way, the membrane of the fluid separation system functions to separate solutes from a fluid in the first contained fluid environment or the second contained fluid environment.

Other embodiments of the invention include methods for separating compounds present in a fluid using membranes made from the unique polyaniline compositions disclosed herein. Typically in such methods, the polyaniline membranes are coupled to a device having an organization of elements designed to separate fluids (e.g. reservoirs, fluid conduits and the like). In these methods, membranes made from these polyaniline compositions allow solutes present in a fluid selectively migrate through the membrane and be separated from the fluid. In one illustrative embodiment of the invention, the method is used to separate compounds from water so as to make the water suitable for human consumption (e.g. as part of a sterilization or desalinization process). In another illustrative embodiment of the invention, the method is used to separate compounds from blood (e.g. as part of a dialysis process).

Other objects, features and advantages of the present invention will become apparent to those skilled in the art from the following detailed description. It is to be understood, however, that the detailed description and specific examples, while indicating some embodiments of the present invention are given by way of illustration and not limitation. Many changes and modifications within the scope of the present invention may be made without departing from the spirit thereof, and the invention includes all such modifications.

BRIEF DESCRIPTION OF THE FIGURES

FIG. 2A provides schematics of the chemical structures, dopants, and conductivities for a number of illustrative conductive polymers. FIG. 2B provides a schematic representation of π-conjugation in poly(acetylene). Left panel: basic schematic. Right panel: 3-D schematic, including defects.

DETAILED DESCRIPTION OF THE EMBODIMENTS

Figure 1A:
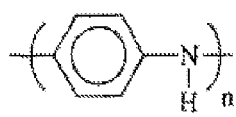
FIG. 1A provides a schematic of a chemical structure of polyaniline.

Unless otherwise defined, all terms of art, notations and other scientific terms or terminology used herein are intended to have the meanings commonly understood by those of skill in the art to which this invention pertains. In some cases, terms with commonly understood meanings are defined herein for clarity and/or for ready reference, and the inclusion of such definitions herein should not necessarily be construed to represent a substantial difference over what is generally understood in the art.

Many of the techniques and procedures described or referenced herein are well understood and commonly employed using conventional methodology by those skilled in the art. As appropriate, procedures involving the use of commercially available kits and reagents are generally carried out in accordance with manufacturer defined protocols and/or parameters unless otherwise noted.

All publications mentioned herein are incorporated herein by reference to disclose and describe the methods and/or materials in connection with which the publications are cited. Publications cited herein are cited for their disclosure prior to the filing date of the present application. Nothing here is to be construed as an admission that the inventors are not entitled to antedate the publications by virtue of an earlier priority date or prior date of invention. Further the actual publication dates may be different from those shown and require independent verification.

It must be noted that as used herein and in the appended claims, the singular forms "a", "and", and "the" include plural referents unless the context clearly dictates otherwise. Thus, for example, reference to "a polymer" includes a plurality of polymers and equivalents thereof known to those skilled in the art, and so forth. All numbers recited in the specification and associated claims that refer to values that can be numerically characterized with a value other than a whole number (e.g. between 1,000 and $10^6$) are understood to be modified by the term "about".

Compositions, Membranes, Devices and Methods for Making and Using Embodiments of the Invention A. Embodiments of the Invention and their Properties At concentrations higher than 10 wt %, polyaniline compositions made by conventional polymerization processes form a gel in 2-methyl-pyrrolidone (NMP) solvent in the absence of any cosolvents. This concentration threshold for polyaniline gel formation can be problematical in situations where higher concentrations of polyaniline are needed, but a gel form of this composition is not desirable. Such situations include processes for the formation of polyaniline ultrafiltration membranes (e.g. phase inversion), processes that typically require higher concentrations of polymer to operate efficiently (e.g. in excess of 10-15 wt %). Embodiments of the invention address such problems by providing a process for making polyaniline compositions having new material properties as well as polyaniline compositions made by this process. As discussed below, the polyaniline compositions produced by this process form a dispersion (not a gel) in 2-methyl-pyrrolidone solvent at concentrations above 10 wt % (and up to at least 18 wt %), even in the absence of co-solvent additives. Consequently, polyaniline compositions having these material properties can be used in a wider variety of processes than polyaniline compositions formed by conventional techniques.

The invention disclosed herein has a number of embodiments. One embodiment of the invention is a method of making polyaniline compositions having enhanced material properties such as an increased solubility in NMP. Typically such methods comprise combining aniline monomers and an aniline polymer initiator together in a single step so as to form an oxidative polymerization reaction; and subjecting the oxidative polymerization reaction to a mechanical force during the oxidative polymerization reaction, wherein the mechanical force is sufficient to disrupt a nucleation process of a polyaniline polymer formed by the oxidative polymerization reaction. Typically, the oxidative polymerization reaction proceeds at room temperature (e.g. 20-25 degrees centigrade). In polyaniline polymers made by conventional polymerization processes, the aniline subunits are linked together predominantly via covalent bonds at the para position moieties on aniline rings. In contrast, without being bound by a specific scientific theory or principle, in certain embodiments of the invention, the oxidative polymerization reaction is believed to form polyaniline polymers having a higher proportion of covalent bonds at meta and/or ortho position moieties on aniline rings as compared to polyaniline polymers formed in an oxidative polymerization reaction where the initiator is added in a stepwise manner; and/or in an oxidative polymerization reaction at a temperature below 15 degrees centigrade. Typically the high defect density polyaniline polymers formed by the polymerization processes disclosed herein exhibit a decreased ability to form the interchain hydrogen bonding interactions in NMP solvent as compared to aniline polymers formed via conventional polymerization processes.

Another embodiment is a composition of matter comprising a plurality of polyaniline polymers, wherein the plurality of polyaniline polymers have an average molecular weight that falls between 1,000 and $1 \times 10^6$ (1,000,000) Daltons; and at concentration of at least 11 or 12 or 13 or 14 or 15 or 16 or 17 or 18 weight %, the plurality of polyaniline polymers form a dispersion (not a gel) in a 2-methyl-pyrrolidone (NMP) solvent in the absence of a cosolvent. By not requiring an organic cosolvent (e.g. a secondary amine cosolvent), these compositions can be used in processes that are cheaper, more environmentally friendly and easier to safely scale up than processes that require such cosolvents. In addition, because a number of common cosolvents are highly toxic (e.g. 2-methyl aziridine, pyrrolidine, morpholine, piperidine, n-methyl-hexyl amine), processes that do not require such agents are inherently safer. While embodiments of the invention typically comprise polyaniline compositions dispersed in a solvent in the absence of any cosolvents, certain embodiments of the invention nonetheless consider the use of one or more cosolvents to further enhance solubility. In one such embodiment of the invention, at concentration of at least 16 or 17 or 18 weight %, the plurality of polyaniline polymers form a dispersion in a 2-methyl-pyrrolidone (NMP) solvent in the presence of a cosolvent.

In typical embodiments of the invention, the plurality of polyaniline polymers in a composition of the invention typically have an average molecular weight that falls between 1,000 and $1 \times 10^6$ (1,000,000) Daltons. In some embodiments of the invention, the polyaniline polymers of the present invention possess relatively high average molecular weights, typically above 100,000, or 200,000, or 300,000 Daltons. In embodiments of the invention, the plurality of polyaniline polymers in a composition of the invention can have an average molecular weight of between 10,000 and 1,000,000 Daltons, or between 10,000 and 500,000 Daltons, or between 10,000 and 100,000 Daltons, or between 50,000 and 100,000 Daltons. In some embodiments of the invention, the plurality of polyaniline polymers in a composition of the invention can have an average molecular weight of between 60,000 and 70,000 Daltons. Similarly, in certain embodiments of the invention, the plurality of polysulfone polymers in a composition of the invention typically have an average molecular weight of between 1,000 and 1,000,000 Daltons, or between in the range of 10,000-1,000,000 Daltons, or between in the range of 10,000-100,000 Daltons, or between in the range of 50,000-100,000 Daltons, or between the range of 60,000 and 70,000 Daltons.

Aniline monomers that can be used in embodiments of the invention include aniline as shown in FIG. 1A as well as aniline derivatives. Aniline derivatives for use in embodiments of the present invention include, but are not limited to, alkylanilines, alkoxyanilines, haloanilines (including fluoro-, chloro- bromo- and iodo-anilines), anisidines and mixtures thereof. Optionally for example a polyaniline derivative is a toluidene, ethylaniline, fluoroaniline, and/or mixtures thereof. In addition, in the compositions of the invention, the oxidation state of the polyaniline can be modulated. For example, in certain embodiments of the invention, a majority polyaniline polymers in the composition are at least in a protoemeraldine oxidation state. In other embodiments of the invention, a majority polyaniline polymers in the composition are at least in a emeraldine oxidation state. In other embodiments of the invention, a majority polyaniline polymers in the composition are at least in a nigraniline oxidation state. Optionally in the polymerization processes disclosed herein, the aniline polymer initiator functions as an oxidizing agent.

Typical embodiments of the invention comprise the polyaniline compositions disclosed herein combined with an additional compound selected to modulate the material properties of these compositions, for example other polymeric materials such as a polysulfone (e.g. polysulfone polymers have an average molecular weight of between 1,000 and $1 \times 10^6$ Daltons). In some embodiments of the invention the composition includes a hydrophilic agent that contributes to the hydrophilicity of the composition, for example a polyvinyl alcohol, a polyvinyl pyrrole, a polyvinyl pyrrolidone, a hydroxypropyl cellulose, a polyol such as polyethylene glycol, a saponified polyethylene-vinyl acetate copolymer, a triethylene glycol, a diethylene glycol or the like or mixtures thereof. The polyaniline compositions of the invention can comprise a doping agent that contributes to the electrical conductivity of the composition, for example an acid such as $H_2SO_4$. In this context, U.S. Pat. No. 5,096,586 describes a variety of dopant species and their selection (i.e., choosing a proper sized dopant species with the appropriate acid strength and/or redox potential) as well as control of the doping/redoping process (i.e., employing the appropriate concentration of dopant). Illustrative dopants include Bronsted and Lewis acids. In addition, the polyaniline compositions can be mixed with, encapsulate, or entrap other materials typically used with this class of membranes (e.g. zeolites and the like). Additional agents that can be combined with the polyaniline compositions disclosed herein include those described for example in Fan et al., J. Membr. Sci., 2008, 320, 363-371; Ball et al., J. Membr. Sci., 2000, 174, 161-176; Anderson et al., Science, 1991, 252, 1412-1415; U.S. Pat. No. 5,096,586; U.S. Provisional Patent Application No. 61/260,365; WO 2009/039467; WO 2006/098872; U.S. Patent Publication No. 20050270442; U.S. Patent Publication No. 20080233400; U.S. Patent Publication No. 20070194286; U.S. patent application Ser. No. 11/927,521; and U.S. patent application Ser. No. 11/364,885, the contents of which are incorporated by reference.

As discussed in detail below, other embodiments of the invention include filtration membranes formed from the unique polyaniline compositions disclosed herein, for example those formed using a phase inversion processes. In addition to modifying the polyaniline compositions of the invention by combining these compositions with one or more compounds selected to modulate the material properties of these compositions, the filter membranes made from these compositions can also be modified by the addition of compounds after the membrane is formed, for example those selected to decrease fouling and/or enhance membrane hydrophilicity. For example membrane surfaces can be modified by applying a coating layer comprised of a hydrophilic polymer such as polyvinyl alcohol (PVA), polyvinyl pyrrole (PVP), or polyethylene glycol (PEG). A number of methods of surface modification are known in the art including conventional simple dip-coating and interfacial polymerization methods as well as plasma, photochemical, and redox initiated graft polymerization, drying-leaching (two-step), electrostatically self-assembled multi-layers, Gilron et al., Desalination 140 (2001) 167-179; Hammond, Science 4 (1999) 430-442; Gilron et al. Effects of surface modification on antifouling and performance properties of reverse osmosis membranes, Desalination, 140 (2001) 167-179. Ma et al. Separation Science and Technology, 36 (2001) 1557-1573. Ma et al., Journal of Membrane Science, 173 (2000) 191-200. Chiang et al., Journal of Applied Polymer Science 43 (1991) 2005-2012.

As discussed below, the hydrophilicity and/or the roughness of the membranes of the invention can be modulated and/or characterized using techniques disclosed herein and/or adapted from those known in the art. The hydrophilicity of the membranes can be expressed in terms of the pure water equilibrium contact angle. The contact angles of the membranes of the invention can be measured using a contact angle goniometer (e.g. DSA10, KRUSS GmbH). In one embodiment, a membrane of the invention can have a pure water equilibrium contact angle of less than about 50°. For example, the contact angle can be less than 50°, less than 45°, less than 40°, less than 35°, less than 30°, or less than 25°. The roughness of the membranes of the invention can be modulated using techniques disclosed herein and/or known in the art. In this context, the surface topography of the synthesized membranes can be investigated by atomic force microscopy (AFM). Such investigation allows calculation of a root mean squared (RMS) roughness value for a membrane surface (see, e.g. Hoek et al., Langmuir 19 (2003) 4836-4847). In one embodiment, a membrane of the invention can have an RMS surface roughness of less than 50, 40, 30, 20, 10, 5, 4 or 3 nm.

Membrane embodiments of the invention can be prepared so as to be substantially impermeable to a variety of different impurities that are observed in different liquid environments. As used herein, "impurities" generally refers to materials dissolved, dispersed, or suspended in a liquid. The materials can be undesired; in such a case, the membranes can be used to remove the undesired impurities from the liquid, thereby purifying the liquid, and the liquid can be subsequently collected. The materials can be desired; in such a case, the membranes can be used to decrease the volume of the liquid, thereby concentrating the impurities, and the impurities can be subsequently collected. In one aspect, the membranes can be provided to be substantially impermeable to particular impurities, which can be selected from among impurities known to those of skill in the art including microorganisms such as Cryptosporidium. In a further aspect, the impurities can comprise at least one of sodium ions, potassium ions, magnesium ions, calcium ions, silicates, organic acids, or nonionized dissolved solids with a molecular weight of greater than about 200 Daltons or a mixture thereof. The impurities can be dissolved or dispersed within a liquid. The impurities can be hydrophobic or hydrophilic or neither or a mixture thereof. Exemplary impurities can include ions, neutral species, silicates, and organic compounds, for example, amines or carboxylic acids.

Related embodiments of the invention comprise a fluid separation system comprising a first contained fluid environment; a first fluid conduit in operable contact with the first contained fluid environment to allow fluid movement between the first contained fluid environment and a first external reservoir; a second contained fluid environment; a second fluid conduit in operable contact with the second contained fluid environment to allow fluid movement between the second contained fluid environment and a second external reservoir; and a filtration membrane disposed between the first contained fluid environment and the second contained fluid environment so as to form a permeable barrier between a fluid in the first contained fluid environment and a fluid in the second contained fluid environment. In such fluid separation systems, the membrane is formed from a composition of matter comprising a plurality of polyaniline polymers, wherein the plurality of polyaniline polymers have an average molecular weight of between 1,000 and $1 \times 10^6$ Daltons; and at concentration of at least 11 weight %, the plurality of polyaniline polymers form a dispersion in a 2-methyl-pyrrolidone (NMP) solvent in the absence of a cosolvent. In addition, in such fluid separation systems, the membrane is designed to exhibit a selective permeability so as to allow solutes of a first size to diffuse through the membrane and between fluids in the first and second contained fluid environments and simultaneously inhibits solutes of a second size from diffusing between fluids in the first and second contained fluid environments. In this way, the membrane of the fluid separation system functions to separate solutes from a fluid in the first contained fluid environment or the second contained fluid environment. In one example of this, the permeability of the membrane is selected to modulate the diffusion of constituents having a certain molecular weight (e.g. above or below the molecular weight of bovine serum albumin or another agent disclosed herein).

Typically, a fluid separation system of the invention is part of a device and the first contained fluid environment; the second contained fluid environment; and/or the membrane is operatively coupled to a device housing. In one illustrative system, the first fluid conduit comprises a feed conduit that introduces fluid into the first fluid environment; and the second fluid conduit comprises a permeate conduit that removes fluid from the second fluid environment, so that the system comprises a dead-end membrane filtration configuration (see, e.g. FIG. 6A). In another illustrative system, the first fluid conduit comprises a feed conduit that introduces fluid into the first fluid environment; the first contained fluid environment further comprises a retentate conduit that removes fluid from the first fluid environment; and the second fluid conduit comprises a permeate conduit that removes fluid from the second fluid environment, so that the system comprises a cross flow membrane filtration configuration (see, e.g. FIG. 6B). In certain embodiments of the invention, the system comprises a power source operatively coupled to the membrane so as to supply the membrane with an electrical signal. In addition, membranes of the invention typically include the polyaniline compositions disclosed herein coupled to a porous support, commonly called a "composite membrane" which typically provides physical strength but offers little resistance to flow due to its porosity.

Other embodiments of the invention include methods for separating compounds present in a fluid using membranes made from the unique polyaniline compositions disclosed herein. Typically in such methods, the polyaniline membranes are coupled to a device having an organization of elements designed to separate fluids. In these methods, membranes made from the unique polyaniline compositions allow solutes present in a fluid to selectively migrate through the membrane so that solutes present in the fluid are separated from the fluid. In certain embodiments of the invention, the method is used to separate compounds from water so as to make the water suitable for human consumption (e.g. as part of a sterilization or desalinization process). One such embodiment of the invention provides a method for purifying water using a membrane of the invention having a first face and a second face. This method comprises contacting the first face of the membrane with a first solution of a first volume having a first salt concentration at a first pressure; and contacting the second face of the membrane with a second solution of a second volume having a second salt concentration at a second pressure; wherein the first solution is in fluid communication with the second solution through the membrane, wherein the first salt concentration is higher than the second salt concentration, thereby creating an osmotic pressure across the membrane, and wherein the first pressure is sufficiently higher than the second pressure to overcome the osmotic pressure, thereby increasing the second volume and decreasing the first volume.

In other embodiments of the invention, the method is used to separate compounds from blood. In one illustrative example, a polyaniline composition as disclosed herein is used in a dialysis process. In this context, an important potential improvement to hemodialysis technology is the creation of ultrafiltration (UF) membranes capable of passing the solutes while retaining blood cells and albumin proteins in the blood. The normal functioning kidney exhibits a relatively narrow molecular weight cutoff compared to the synthetic membranes, specifically in the range of ~10-20 kDa. Conventional polymeric membrane materials do not achieve this desired selectivity. Moreover, even the best UF membranes achieve solute separations almost entirely by passive filtration, i.e., steric (size) exclusion. Consequently, advanced membranes are needed with tunable Donnan (charge) exclusion to enable more highly selective separation of microsolutes on the basis of charge as well as size. External control of membrane charge, and thus charged solute selectivity, has important therapeutic implications for improving solute selectivity and controlling the loss of salts, minerals, bicarbonate, and peptides during hemodialysis. In addition, in hemodialysis, adsorbed proteins rapidly foul UF membranes changing water permeability and solute selectivity. Although protein adhesion to UF membranes tends to improve blood compatibility and motivates membrane reuse, this requires washing and sterilization, which increases the human labor component, potentially damages membranes, and increases the risk of infection for a patient. Generally, more hydrophilic materials resist protein adhesion, but polymer hydrophilicity is most often achieved through introduction of acidic functionality. This is particularly undesirable if carboxyl and hydroxyl functional groups are introduced because of the blood-clotting problem; hence, new hydrophilic polymers are needed to form UF membranes without residual hydroxide functionality on their surfaces. External control of membrane charge characteristics allows additional control over protein adhesion and substantially improves fouling resistance of hemodialysis membranes.

Membranes cast from polyaniline (PANi) nanofibers exhibit a 10-fold increase in water flux over identically cast polysulfone (PSf) and PANi-PSf blends. All of the membranes offered similar rejection of nano-silica, which is used as an inert nanoparticulate tracer. These PANi membranes exhibit highly ordered and uniform surface nanopores with a sub-structure that exhibits multi-scale pores. Moreover, contact angle analyses suggest the films are "super-hydrophilic" (past research suggests membranes with contact angles of less than about 40 degrees are adequately hydrophilic to strongly resist protein and cellular adhesion, i.e., super-hydrophilic). PANi films are electrically conducting when acid doped or fabricated from self-doping derivatives of polyaniline. We believe nano-structured PANi membranes represent a breakthrough in hemodialysis and/or hemofiltration membrane technology. The disclosure provided herein suggests that PANi-UF membranes can be produced with (1) extremely sharp molecular weight cutoff in the ~10-20 kDa range due to their highly uniform surface nanopores, (2) high fouling resistance without promoting blood clotting factors due to the hydrophilic interface lacking hydroxyl functionality, and (3) tunable charged solute selectivity due to their electrical conductivity. Such a novel membrane material can revolutionize hemodialysis by improving solute selectivity, fouling resistance, and therapeutic efficacy.

As discussed below, a wide variety of different embodiments of the invention can be made using modifications of various processes and reagents known in the art. Typical processes and reagents known in the art include those described for example in Fan et al., J. Membr. Sci., 2008, 320, 363-371; Ball et al., J. Membr. Sci., 2000, 174, 161-176; Anderson et al., Science, 1991, 252, 1412-1415; U.S. Pat. No. 5,096,586; U.S. Provisional Patent Application No. 61/260, 365; WO 2009/039467; WO 2006/098872; U.S. Patent Publication No. 20050270442; U.S. Patent Publication No. 20080233400; U.S. Patent Publication No. 20070194286; U.S. patent application Ser. No. 11/927,521; and U.S. patent application Ser. No. 11/364,885, the contents of which are incorporated by reference.

B. Illustrative Compositions of the Invention

Typical compositions of the invention comprise polyaniline, commonly in combination with another compound such as a polysulfone. Polyaniline is one of the most useful conducting polymers due to its facile synthesis, environmental stability and simple acid/base doping/dedoping chemistry (see, e.g. MacDiamid, A. G. "Synthetic Metals: A Novel Role For Organic Polymers", Angew. Chem. Int. Ed. 40, 2581 (2001).

Polyaniline is a class of conductive polymers conventionally formed by polymerizing aniline monomers. In the conventional polymerization reaction, nitrogen atoms of aniline monomer units are bonded to the para-carbon in the benzene ring of the next monomer unit. One of the simplest methods for synthesizing bulk polyaniline is the chemical polymerization of aniline with an oxidant ammonium peroxydisulfate in an acidic aqueous solution. Since polymerization is an exothermic process, it has long been recommended that this reaction be carried out at low temperatures with one reactant slowly added into the other in a multiple stepwise manner under vigorous stirring (see, e.g. Cao, Y., Andreatta, A., Heeger, A. J., Smith, P., "Influence Of Chemical Polymerization Conditions On The Properties Of Polyaniline", Polymer 30, 2305 (1989); Chiang, J.-C, MacDiamid, A. G, "Polyaniline-Protonic Acid Doping Of The Emeraldine Form To The Metallic Regime, Synth. Met. 13, 193 (1986)). When polyaniline is synthesized at room temperature or at lower temperatures via the conventional method, using an ordinary magnetic stirrer bar to agitate the reaction mixture, the product settles out quickly from the reaction solution and films cast from its suspension are rough and discontinuous and have therefore been considered to be unsatisfactory for many applications.

While polyaniline is an electrically conductive polymer, polymeric compounds are typically poor conductors of electricity. As is known in the art, the electrical conductivity of polymer compositions can be modulated by the addition of a dopant (also called doping agent and dope), an agent that can alter the electrical properties of such compositions and embodiments of the invention contemplate the use of such agents. For example, the electrical conductivity of polyacetylene (an organic polymer) is increased by a factor of $10^{12}$ by doping it with an electron acceptor such as iodine or arsenic pentafluoride ($AsF_5$) or an electron donor such as an alkali-metal ion (see, e.g. Gibson et al., New Freestanding Conductive Substituted Polyacetylene Film. 1980, 179, (MAR), 93-ORPL, Ikemoto et al., X-Ray Photoelectron Spectroscopic Study Of Highly Conductive Iodine-Doped Polyacetylene. 1979, (10), 1189-1192 and Shirakawa et al., Synthesis Of Electrically Conducting Organic Polymers—Halogen Derivatives Of Polyacetylene, (Ch)X. 1977, (16), 578-580). The conductivity of doped polyacetylene was found to be similar to copper on an equivalent weight basis. Table 1 below compares conductivities and specific gravities for a number of common metals, conducting polymers, and carbon compositions.

TABLE 1

Conductivities and specific gravities of polymers and metals.

| Material | Conductivity* S cm$^1$ | Specific Gravity |
|---|---|---|
| Silver | $10^6$ | 10.5 |
| Copper | $6 \times 10^5$ | 8.9 |
| Aluminum | $4 \times 10^5$ | 2.7 |
| Polyacetylene (doped) | $1.5 \times 10^5$ | 1 |
| Platinum | $10^5$ | 21.4 |
| Polythiophene (doped) | $10^4$ | 1 |
| Mercury | $10^4$ | 13.5 |
| Carbon fiber | 500 | 1.7-2 |
| Carbon-black-filled polyethylene | 10 | 1 |
| $H_2SO_4$ electrolyte | $10^{-1}$ | 2 |
| Polymer electrolyte | $10^{-4}$ | 1 |
| Polytetrafluorethylene (Teflon) | $10^{-18}$ | 2.1-2.3 |
| Polyethylene | $10^{-22}$ | 0.9-0.97 |

*Units of siemans (S) per cm.

The chemical structure, dopants, and conductivities are listed for a number of illustrative conductive polymers are shown in FIG. 2A. A feature common to these polymers is the alternation of single and double bonds along the polymer backbone or ring structure. It is the conjugated π-electron structure, shown in FIG. 2B, which allows for the transport of electrical charge along these polymers. Doping is believed to result in an electron imbalance. The extended π-conjugated structure allows for charge transport along the polymer backbone when an electrical potential is applied.

Many conducting polymers were well known in their non-conducting forms prior to the discovery of their conductive properties. Polyaniline's desirable properties were illuminated in the early 1980s (see, e.g. Huang et al., Conjugated Polymers: Theory, Synthesis, Properties, and Characterization. In Handbook of Conducting Polymers, 3rd ed.; Skotheim, T. A.; Reynolds, J. R., Eds. CRC Press: Boca Raton, Fla., 2007) and have been adapted for use in battery electrodes (see, e.g. Desilvestro et al., Insitu Determination Of Gravimetric And Volumetric Charge-Densities Of Battery Electrodes—Polyaniline In Aqueous And Nonaqueous Electrolytes. 1992, 139, (10), 2727-2736), electromagnetic shielding devices (see, e.g. Joo et al., Electromagnetic-Radiation Shielding By Intrinsically Conducting Polymers. 1994, 65, (18), 2278-2280 and Trivedi et al., Shielding Of Electromagnetic-Interference Using Polyaniline. 1993, 59, (2), 267-272), and anticorrosion coatings (see, e.g. Yao et al., Corrosion inhibition of carbon steel by polyaniline nanofibers. 2008, 62, (12-13), 1775-1778, Alam et al., Development of nanostructured polyaniline dispersed smart anticorrosive composite coatings, 2008, 19, (7), 882-888 and Lu et al., Corrosion Protection Of Mild-Steel By Coatings Containing Polyaniline. 1995, 71, (1-3), 2163-2166). Interest in polyaniline has continued to grow due to its conducting properties, relatively simple synthesis, and the low cost of aniline (see, e.g. Feast et al., Synthesis, processing and material properties of conjugated polymers. 1996, 37, (22), 5017-5047). The chemical structure of polyaniline is shown in FIG. 1A.

Polyaniline is insoluble in water. The formation of polyaniline chains is followed by a rapid precipitation of the polymer. In terms of classical nucleation or precipitation theory (see, e.g. Zettlemoyer, A. C., Nucleation Marcel Dekker, New York (1969)), the molecules need to accumulate to a specific super-saturation level first and then experience nucleation and growth. The nuclei can be formed spontaneously and homogeneously in the parent phase or they can be heterogeneously grown on other species such as reactor surfaces or other particles in solution. Both modes of nucleation occur with polyaniline and the mode that predominates is dependent on the experimental conditions. In particular, the shape of the polyaniline particles is related to the mode of nucleation. Consistent with our previous observations (see, e.g. Huang et al., "Nanofiber Formation In The Chemical Polymerization Of Aniline: A Mechanistic Study", Angew Chem. Int. Ed., 43, 5817 (2004)), at the initial stage of polymerization, as-formed particles are exclusively nanofibers, characterized by smooth surfaces and fairly uniform sizes. Since there are no heteronuclei available in the bulk solution at this stage, this fibrillar shape can be attributed to the result of homogenous nucleation. As the polymerization proceeds under shear, granular nanoparticulates gradually grow on the prior formed nanofibers, leading to the formation of aggregates.

Embodiments of the present invention include new polymerization procedures which allow the production of polyaniline compositions having improved material properties. Typically these procedures involve rapidly mixing/combining aniline and an aniline polymer initiator in a single step so as to form an oxidative polymerization reaction; and subjecting the oxidative polymerization reaction to a mechanical force during the oxidative polymerization reaction, wherein the mechanical force is sufficient to disrupt a nucleation process of a polyaniline polymer formed by the oxidative polymerization reaction. As discussed in the Example below, while not being bound by a specific scientific mechanism or principle, secondary polymer growth in the methods disclosed herein likely occurs during the rapid mixing step, which produces polyaniline agglomerates rather than discrete nanofibers. Unlike the discrete aniline nanofibers produced by conventional polymerization processes, the polyaniline compositions produced by the polymerization processes are driven to form agglomerates. Unlike the polyaniline nanofiber compositions made by conventional polymerization processes which gel and form irregular globular structures during procedures designed to form such compositions into filters, these polyaniline agglomerate compositions do not exhibit this tendency and instead form a more uniform material when being processed. Consequently, a critical difference between the nanofibrous polyaniline compositions previously described in the art and the agglomerated polyaniline compositions disclosed herein is their processability. The processability of these agglomerated polyaniline compositions facilitates their use in a wide variety of contexts, for example their use in methods for making filtration membranes.

Figure 1B:
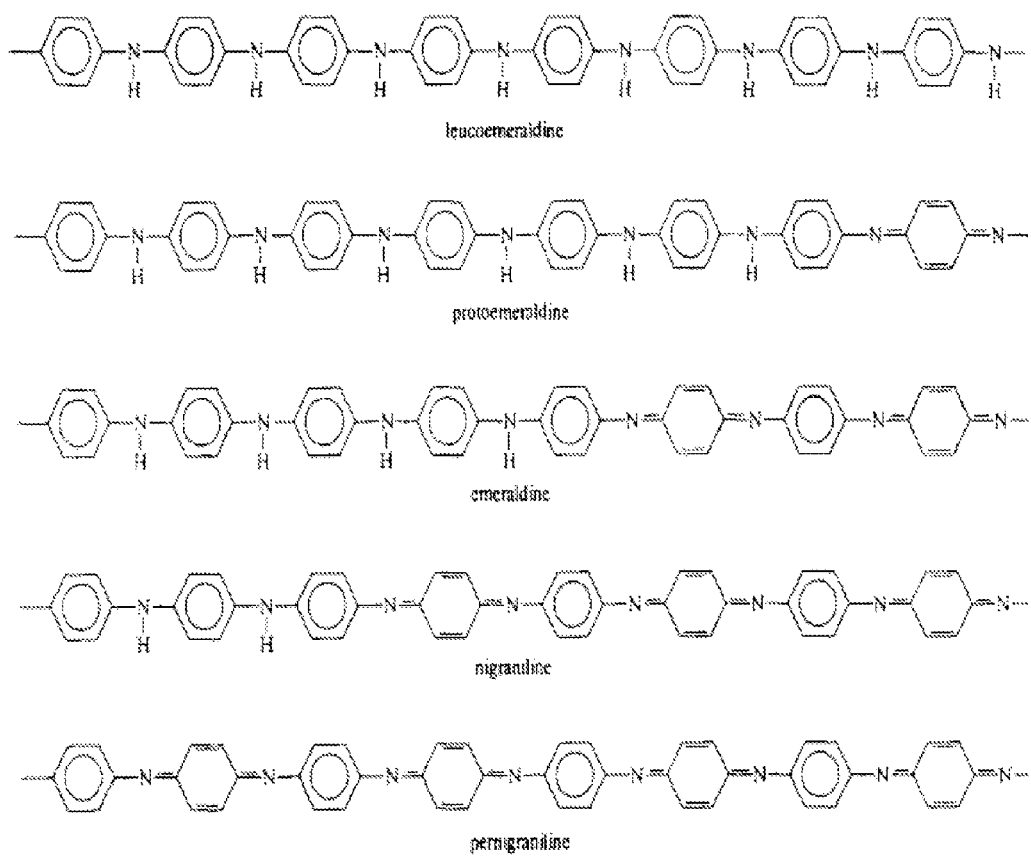
FIG. 1B provides a schematic of chemical structures of different polyaniline oxidation states.

Polyaniline can exist in a number of different oxidation states, which are shown in FIG. 1B. The oxidation states range from fully reduced (leucoemeraldine) down to fully oxidized (pernigraniline). Polyaniline in the emeraldine state has half of its nitrogens in the amine form and half in the imine form. Unlike most conducting polymers, the fully oxidized form of polyaniline is typically not conducting. Polyaniline in the emeraldine oxidation state is capable of carrying charge. The emeraldine state of polyaniline becomes electrically conducting when doped with a salt that protonates all imine nitrogens on the polymer backbone. The undoped emeraldine base form of polyaniline has a conductivity below $10^{-10}$ $S \cdot cm^{-1}$. Doped emeraldine polyaniline has a conductivity on the order of 1 $S \cdot cm^{-1}$ (see, e.g. Huang et al., A Novel Conducting Polymer—Morphology And Chemistry Of Its Oxidation And Reduction In Aqueous-Electrolytes. 1986, 82, 2385-&). The conductivity of polyaniline containing water is five times higher than completely dry polyaniline. In certain embodiments of the invention, a majority polyaniline polymers in the composition (and or membrane) are at least in a protoemeraldine oxidation state. In other embodiments of the invention, a majority polyaniline polymers in the composition are at least in a emeraldine oxidation state. In other embodiments of the invention, a majority polyaniline polymers in the composition are at least in a nigraniline oxidation state.

Figure 1C:
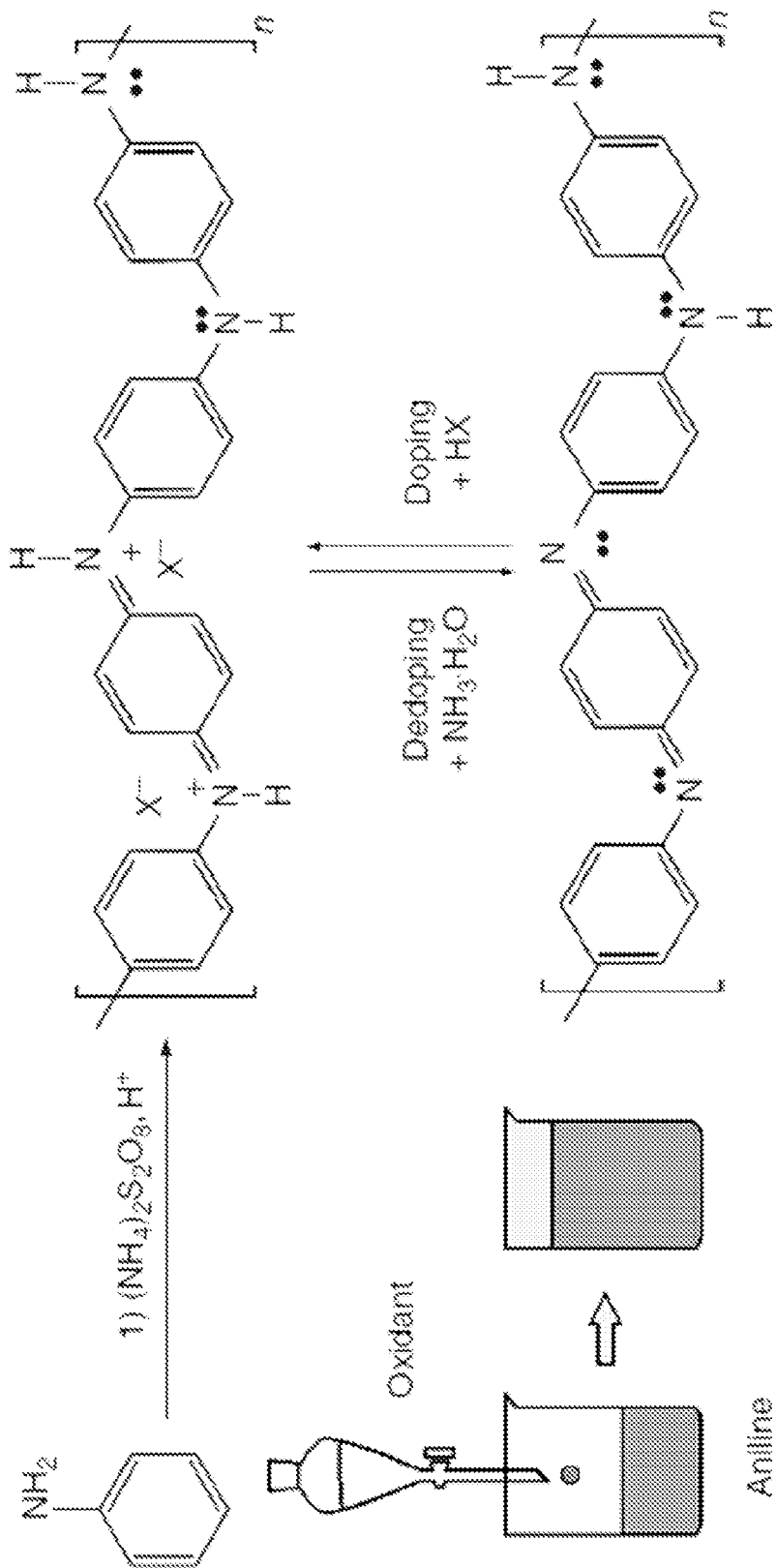
FIG. 1C provides a schematic of the oxidative polymerization of aniline in an acidic solution. The synthesized polyaniline forms in its doped emeraldine salt state that then can be deoped by a base to its emeraldine base form. The bottom left portion of this scheme illustrates a typical reaction for making polyaniline.

The electrical conductivity of polyaniline compositions can be modulated by the addition of a dopant and certain embodiments of the invention include such agents. Doping of polyaniline polymers is typically achieved by adding common acids such as hydrochloric acid. Protonic acid doping of polyaniline is unique in that no electrons have been added or removed from the polymer to make it conducting. Other oxidation states of polyaniline can be made by doping with oxidants like iodine, but these forms are much less conductive than those formed by protonic doping (see, e.g. Wang et al., On The Iodine-Doping Of Polyaniline And Poly-Ortho-Methylaniline. 1991, 41, (1-2), 739-744). Dedoping is carried out using common bases such as ammonium hydroxide. Electrochemical processes may also be used to dope and dedope polyaniline. Doping and dedoping not only affects polyaniline conductivity, but these processes can also strongly influence polyaniline film morphology. The oxidation of aniline to polyaniline is typically achieved chemically or electrochemically in acidic media. Chemical oxidation is usually carried out in an aqueous acidic solution containing an oxidizing agent/oxidant such as ammonium peroxydisulfate (see, e.g. Scherr et al., Polyaniline—Oriented Films And Fibers. 1991, 41, (1-2), 735-738). FIG. 1C illustrates the oxidative polymerization of polyaniline, and subsequent doping and dedoping of the polymer.

Figure 1D:
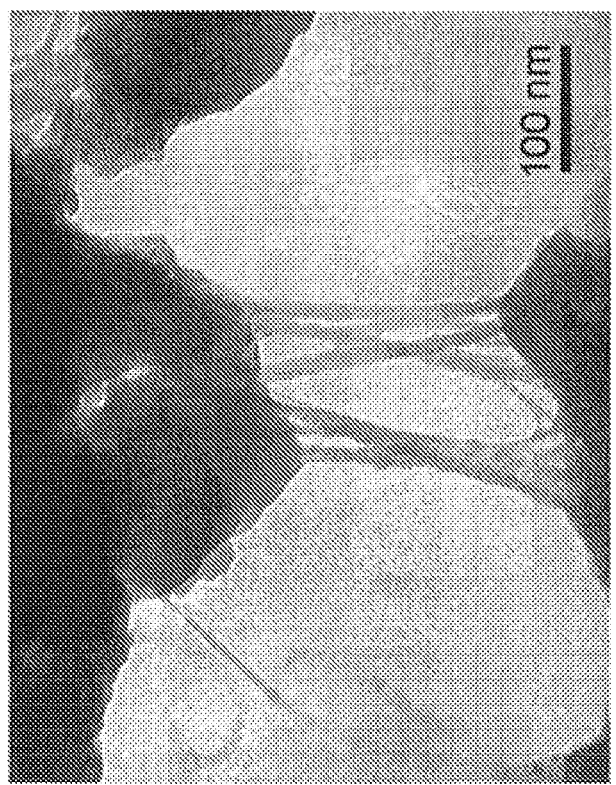
FIG. 1D provides transmission electron microscopy (TEM) images of polyaniline powders made by traditional chemical polymerization using 1.0 M HCl and showing a small portion of nanofibers (arrows) in the sample. A magnified view of the nanofibers is shown on the right.
Figure 1D:
Figure 1E:
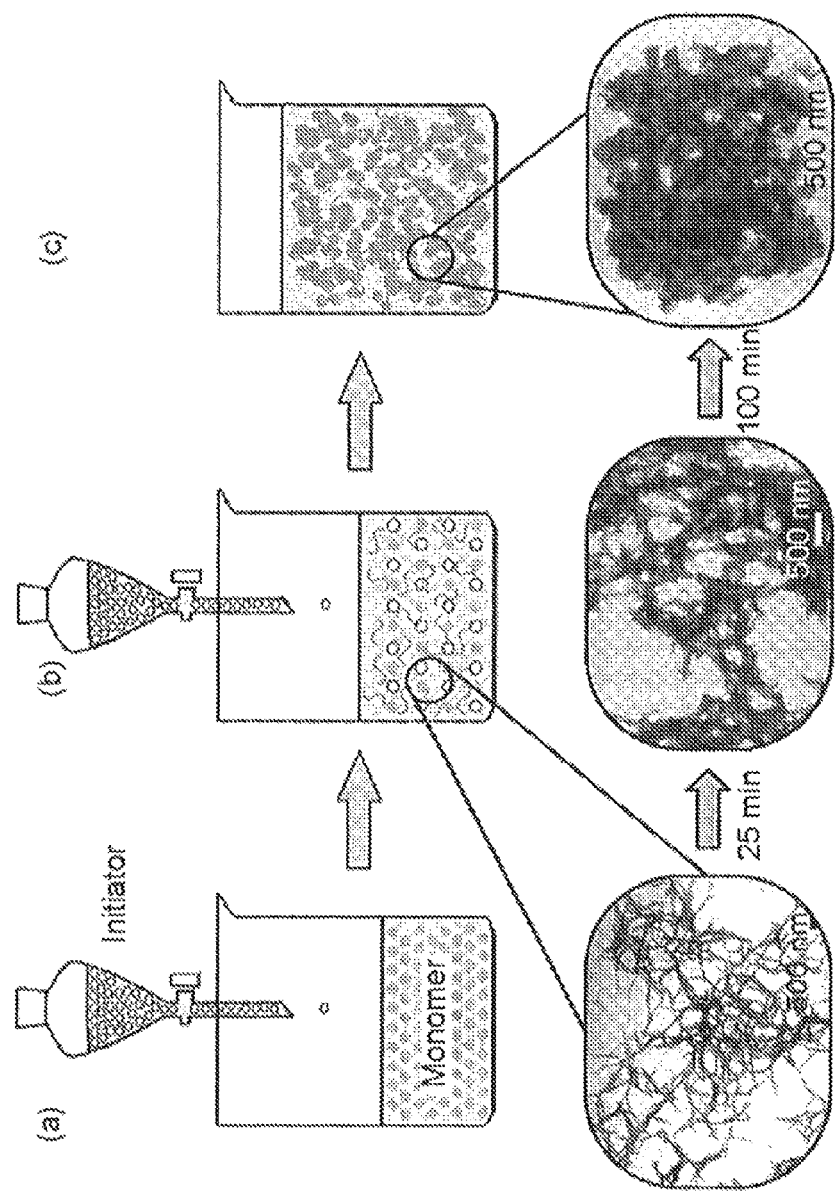
FIG. 1E provides a schematic of the morphological evolution of polyaniline during chemical polymerization (a) is explored by electron microscopy. It shows that nanofibers are produced in the early stages of polymerization (b) and then turn into large, irregularly shaped agglomerates (c) due to secondary growth. All three TEM images have the same magnification.

Polyaniline can be formed into different nanostructures including nanowires, nanorods, nanotubes, and nanofibers, and there are several techniques used to synthesize each structure. The conventional chemical oxidative polymerization of aniline to polyaniline, described and illustrated above, has been found to produce granular polyaniline (see, e.g. Avlyanov, J. K.; Josefowicz, J. Y.; Macdiamid, A. G., Atomic-Force Microscopy Surface-Morphology Studies Of In-Situ Deposited Polyaniline Thin-Films. 1995, 73, (3), 205-208). However, upon closer examination of the granular polyaniline, there appear to be a small portion of nanofibers as shown in FIG. 1D (see, e.g. Huang et al., 2004, 126, (3), 851-855). Polyaniline nanofibers are formed early during chemical polymerization (see, e.g. United States Patent Application 20070194286). As this reaction continues, the secondary growth and aggregation of nanofibers can create granular polyaniline as shown in FIG. 1E. If polyaniline nanofibers are the desired product, secondary growth should be inhibited. This can be achieved by interfacial polymerization or by rapidly mixed polymerization reactions. Both methods yield polyaniline nanofibers with diameters between 30 and 120 nm with lengths from 500 nm to several microns. However, the interfacial polymerization method requires use of an organic solvent in addition to aniline, ammonium peroxydisulfate, and an aqueous acid.

Figure 1F:
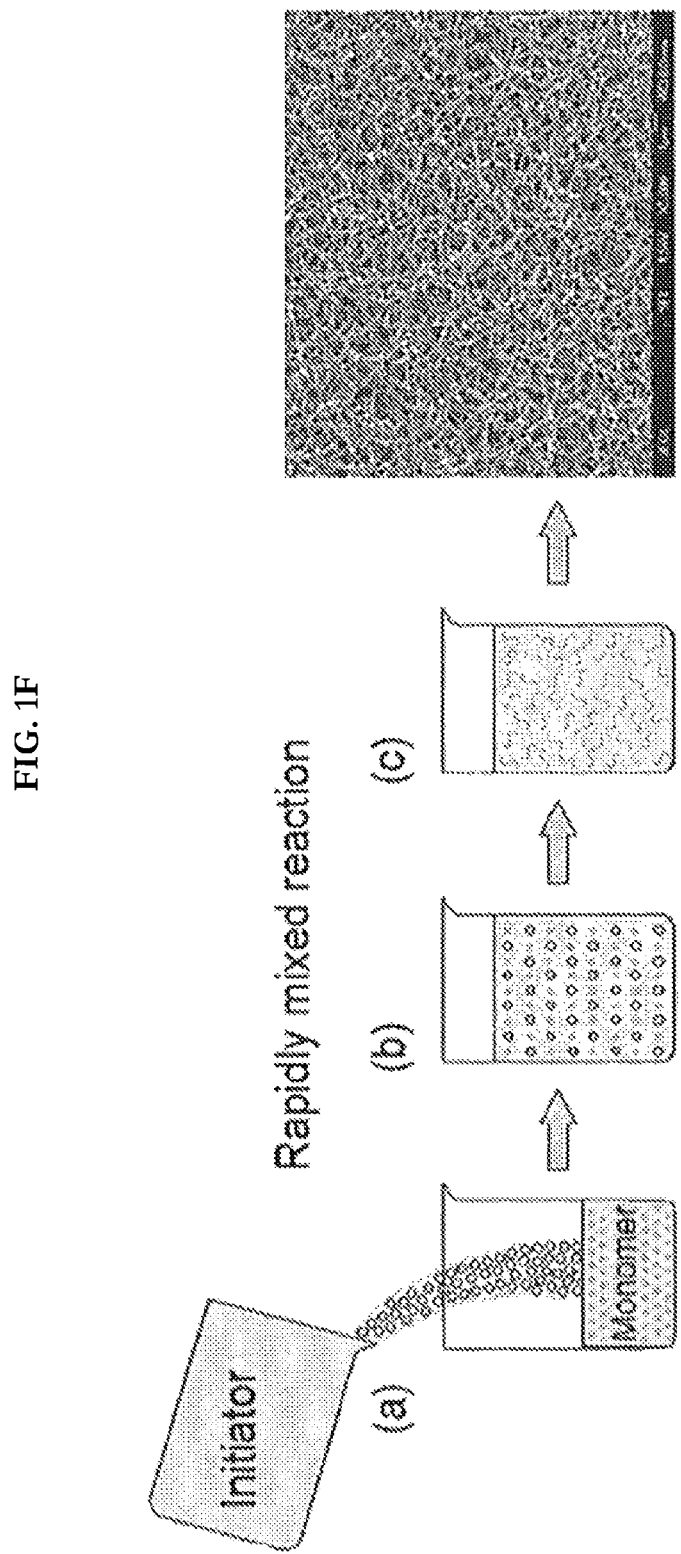
FIG. 1F provides a schematic illustration showing a rapidly mixed polymerization reaction in which (a) the initiator and monomer solutions are rapidly mixed together all at once. Therefore (b and c), the initiator molecules are depleted during the formation of nanofibers, disabling further polymerization that leads to overgrowth. Pure nanofibers are obtained as shown in the scanning electron microscope (SEM) image on the right.

Another advantage of the rapidly mixed polymerization reaction processes disclosed herein is that they do not require an organic cosolvent, which makes this process cheaper, more environmentally friendly and easier to safely scale up. The same reagents are used in these rapid mixed reaction processes as are used in conventional polyaniline synthesis procedures. A difference however lies in the rapid combination of initiator solution with the monomer solution rather than the dropwise addition of initiator as done in conventional polyaniline synthesis. This method is illustrated in FIG. 1F. The initiator solution (ammonium peroxydisulfate dissolved in an aqueous acid solution) is rapidly mixed together with the monomer solution (aniline dissolved in an aqueous acid). The mixture is rapidly stirred to evenly distribute initiator and monomer prior to polymerization. Once polymerization begins, the initiator molecules induce the formation of nanofibers by quickly polymerizing aniline monomers. All initiator molecules are consumed in the making of polyaniline nanofibers and are therefore unable to induce secondary growth of polyaniline.

Polyaniline nanofibers are typically recovered by filtration and washed with a basic solution followed by deionized water and methanol solutions. The washed polymer is dried in an oven at 50° C. overnight. Polyaniline is soluble in a variety of solvents such as N,N-dimethylformamide (DMF) (see, e.g. Xia et al., Camphorsulfonic Acid Fully Doped Polyaniline Emeraldine Salt—Conformations In Different Solvents Studied By An Ultraviolet-Visible Near-Infrared Spectroscopic Method. 1995, 7, (3), 443-445), and N-methylpyrrolidinone (NMP) (see, e.g. Virji et al., Polyaniline nanofiber gas sensors: Examination of response mechanisms. 2004, 4, (3), 491-496 and Angelopoulos et al., Effect of selected processing parameters on solution properties and morphology of polyaniline and impact on conductivity. 1997, 84, (1-3), 35-39), chloroform, benzyl alcohol, hexafluoroisopropanol (HFIP) (see, e.g. Hopkins et al., Characterization of solution and solid state properties of undoped and doped polyanilines processed from hexafluoro-2-propanol. 1996, 29, (24), 7838-7846), m-cresol (see, e.g. Matveeva et al., Variation of AC electrical properties of emeraldine base of polyaniline during its drying from suspension in m-cresol. 1996, 79, (2), 159-163), p-cresol, 2-chlorophenol, 2-fluorophenol, 3-ethylphenol, and formic acid (see, e.g. Hatchett et al., Acid doping of polyaniline: Spectroscopic and electrochemical studies. 1999, 103, (50), 10992-10998).

C. Illustrative Membranes and Associated Methodological Embodiments of the Invention Synthesis of Porous (Particle Filtration) Membranes Membranes comprising the compositions disclosed herein can be produced by a number of procedures known in the art. Typical processes and reagents known in the art include those described for example in Fan et al., J. Membr. Sci., 2008, 320, 363-371; Ball et al., J. Membr. Sci., 2000, 174, 161-176; Anderson et al., Science, 1991, 252, 1412-1415; U.S. Pat. No. 5,096,586; U.S. Provisional Patent Application No. 61/260, 365; WO 2009/039467; WO 2006/098872; U.S. Patent Publication No. 20050270442; U.S. patent application Ser. No. 11/927,521; and U.S. patent application Ser. No. 11/364,885, the contents of which are incorporated by reference.

Phase inversion is a common method used to synthesize porous membranes. Polymers are controllably transformed from a liquid state to a solid state by this process. Solidification is initiated by the formation of two liquid phases from a single liquid phase. This is known as liquid-liquid demixing. During liquid-liquid demixing, the high polymer concentration phase begins to solidify and form a matrix. Membrane structure can be tailored by controlling liquid-liquid demixing. Phase inversion covers several specific techniques such as vapor phase precipitation, solvent evaporation, thermal precipitation, and immersion precipitation. Immersion precipitation is the most common technique used to produce phase inversion membranes (see, e.g. Mulder, M., Basic Principles of Membrane Technology. 2nd Edition ed.; Kluwer Academic Publishers: Dordrecht, The Netherlands, 2003).

Factors that influence phase inversion membrane morphology include: (1) the choice of solvent/nonsolvent system; (2) the composition of the polymer solution, which includes the polymer selected, its concentration and molecular weight distribution plus addition of other polymers or nonsolvent; (3) the composition of the coagulation bath, which is generally limited to adding solvent up to the binodal; and (4) film casting conditions such as polymer solution and coagulation bath temperature, film thickness, immersion in a non-solvent with low mutual affinity to the solvent or use of an evaporation step before immersing into the nonsolvent. The latter two techniques of item (4) are generally used to produce integrally skinned membranes for gas separation, vapor permeation, or pervaporation.

Figure 3:
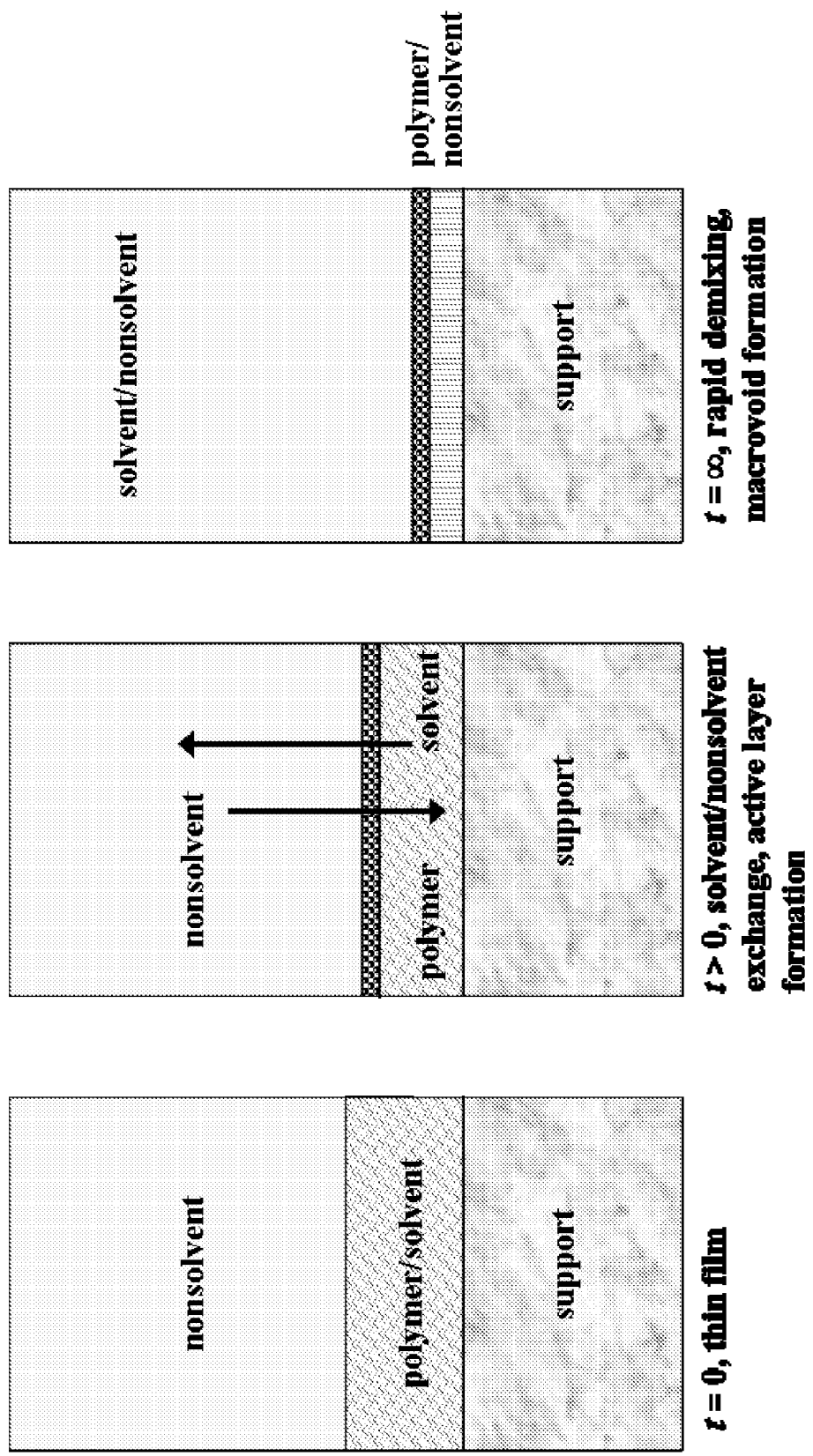
FIG. 3 provides a schematic of an illustrative immersion precipitation membrane formation.

Immersion precipitation membranes are typically formed by casting a polymer solution as a thin film on a support. The polymer solution, or dope, is composed of polymer, solvent, and may contain some additives. The thin film and support are immersed in a coagulation bath. A coagulation bath consists of the nonsolvent and may contain additives. Solvent diffuses out of the polymer/solvent phase and into the coagulation bath while nonsolvent diffuses into the polymer/solvent phase as shown in FIG. 3. This continues until the polymer/solvent/nonsolvent system becomes thermodynamically unstable and demixing, or polymer precipitation, occurs and a solid polymeric membrane is formed. The time to the demixing step determines the ultimate membrane structure. Delayed demixing results in membranes with a dense, nonporous top layer. These membranes are typically used in gas separation and pervaporation applications. Instantaneous demixing results in membranes with relatively porous top layers useful as filtration membranes.

The choice of solvent/nonsolvent system in filtration membrane synthesis is significant. The polymer is typically soluble or easily dispersible in the chosen solvent. There are usually several solvents that are compatible with a given polymer. However, the solvent can also be paired with a nonsolvent in which it is miscible. Table 2 below lists several solvents which are compatible with polysulfone and are miscible with water.

TABLE 2

Solvents compatible with polysulfone/water system.

| polymer/nonsolvent | solvent |
|---|---|
| polysulfone/water | dimethylformamide (DMF) |
| | dimethylacetamide (DMAc) |
| | dimethylsulfoxide (DMSO) |
| | formylpiperidine (FP) |
| | morpholine (MP) |
| | N-methylpyrrolidone (NMP) |

Factors Used to Modulate Membrane Morphology

Figure 4:
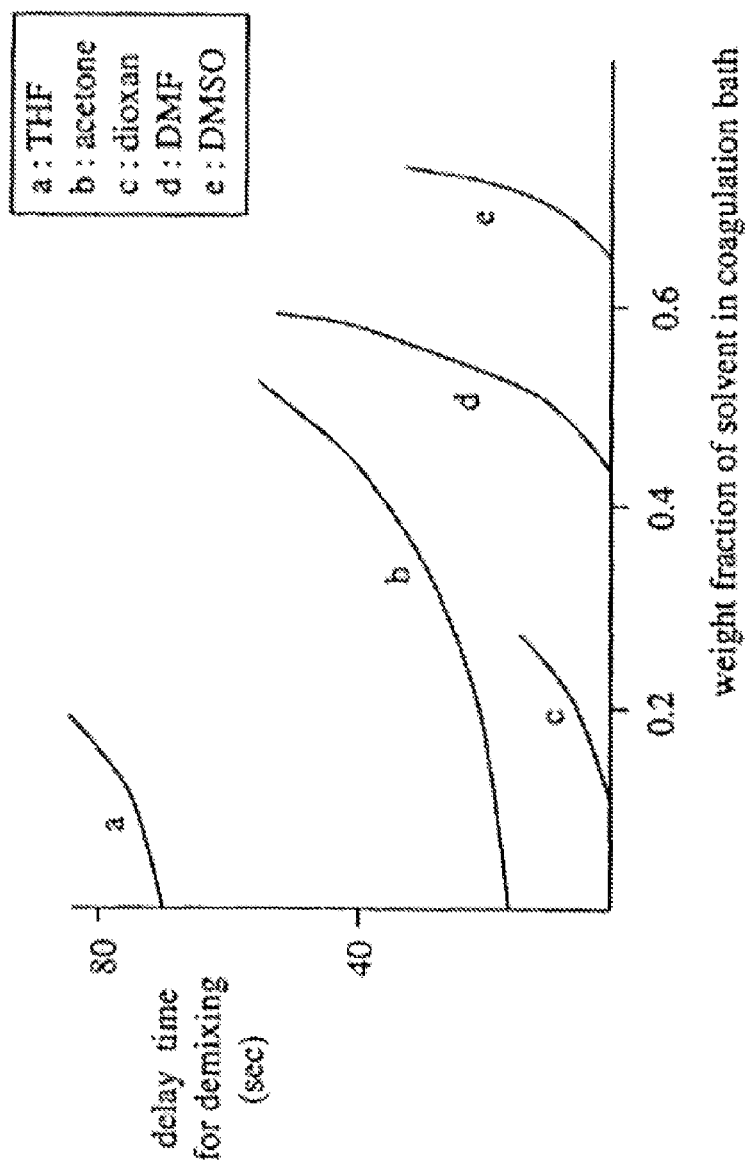
FIG. 4 provides a graph illustrating the demixing delay time for cellulose acetate/water/solvent system.

In certain embodiments of the invention, one or more processes is controlled so as to modulate a property such as the morphology of a polyaniline membrane as disclosed herein. For example, the polymer typically should not be soluble or dispersible in the chosen nonsolvent. Water is commonly used as the nonsolvent in immersion precipitation membrane syntheses. Solvent/nonsolvent choice affects membrane structure/morphology. Pairing solvents and nonsolvents that are less miscible delays liquid-liquid demixing, which tends to result in the formation of very dense membranes. Alternatively, pairing solvents and nonsolvents with high mutual affinity can lead to instantaneous liquid-liquid demixing, ultimately resulting in porous membranes (see, e.g. Mulder, M. H. V. Ph.D. Thesis. University of Twente, 1984). A cellulose acetate/solvent/water system is used as an example relationship between solvent miscibility and demixing delay time. Solvent miscibility with water decreases in the following order: DMSO>DMF>dioxan>acetone>tetrahydrofuran (THF). FIG. 4 shows the delay time for demixing for 15% cellulose acetate/solvent in water solutions. The least miscible solvent, THF, has the largest delay time for demixing. The most miscible solvent, DMSO, has no delay time until it is at higher concentrations in the coagulation bath. Demixing delay times decrease as solvent miscibility increases. Solvents that are highly miscible with nonsolvents cause instantaneous demixing, which produces porous membranes. Thus, membrane morphology can be modulated by choosing appropriate solvent/nonsolvent systems.

Many different polymers can used in the synthesis of filtration membranes to effect morphology. Polymeric MF membranes are segregated into two classes, hydrophobic and hydrophilic. Hydrophobic MF membrane materials include poly(vinylidene fluoride) (PVDF), polyethylene (PE), polytetrafluoroethylene (PTFE, Teflon), and polypropylene (PP). Hydrophilic MF membrane materials include polycarbonate (PC), polysulfone (PSf), poly(ether sulfone) (PES), cellulose esters, polyetheretherketone (PEEK), (aliphatic) polyamide (PA), polyimide (PI), and poly(ether imide) (PEI) Crittenden et al., Water Treatment: Principles and Design. 2nd ed.; John Wiley & Sons, Inc.: Hoboken, N.J., 2005). Microfiltration membranes are typically symmetric in structure. Porosity and pore structure are fairly homogenous throughout the thickness of MF membranes.

Figure 5:
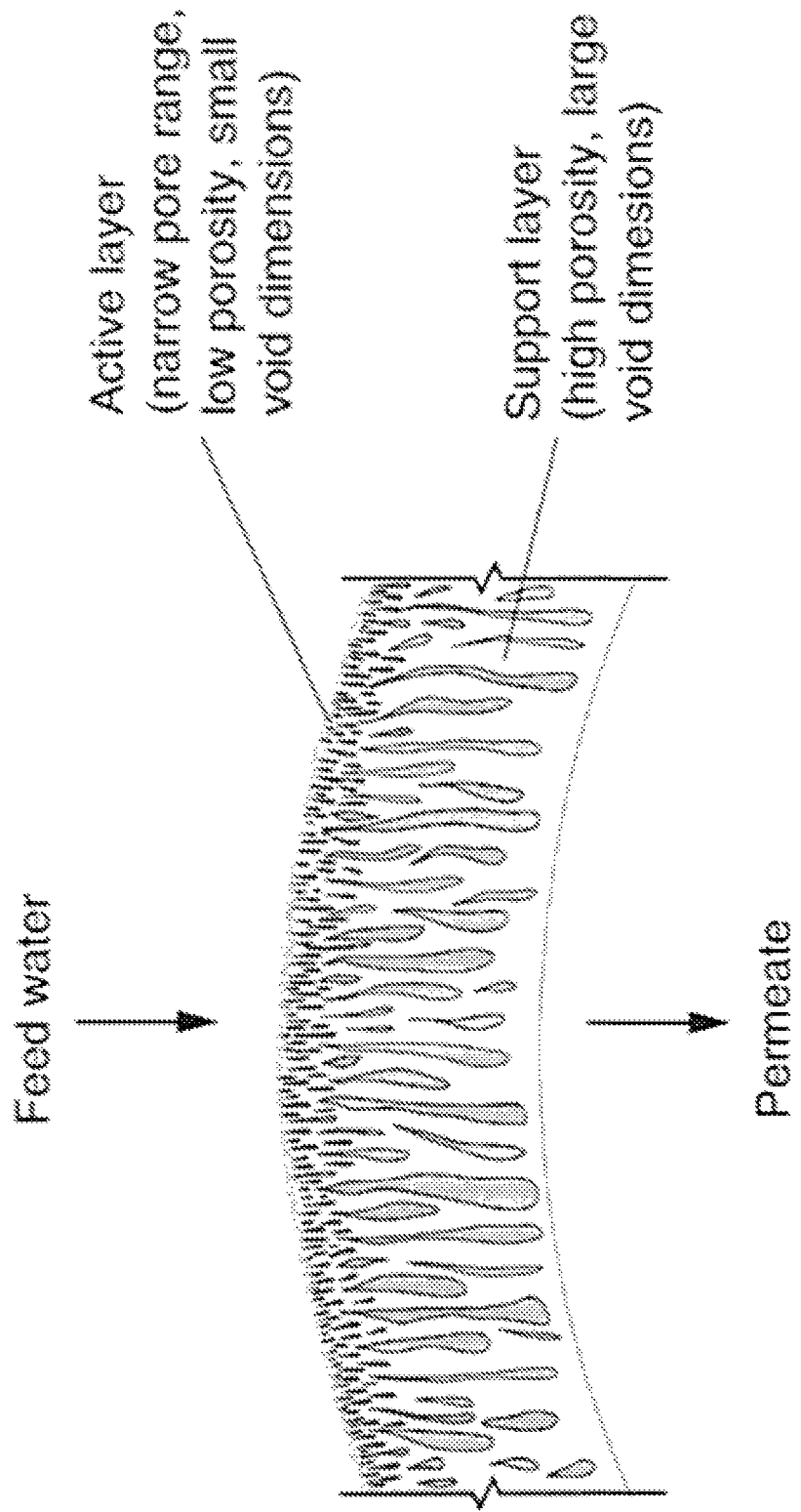
FIG. 5 provides an illustration of an ultrafiltration membrane showing an asymmetric structure. As shown by this illustration, ultrafiltration membranes have a thin "skin" layer containing small pores. Below the skin layer are larger voids.

As shown in FIG. 5, ultrafiltration membranes can have an asymmetric structure and typically have a thin "skin" layer containing small pores. Below the skin layer are larger voids. Polymers traditionally used to make UF membranes include PVDF, cellulosics, PSf, PES, sulfonated PSf, PI, PEI, PEEK, polyacrylonitrile, and PA. Ultrafiltration membranes are typically hydrophilic, as evidenced by the polymers used in their synthesis. Membrane hydrophilicity typically determines membrane permeability and fouling propensity.

Polymer concentration in a dopant solution is yet another parameter affecting membrane morphology. Typical polymer concentration ranges from 15-20 weight percent (see, e.g. Baker, R. W., Membrane Technology and Applications. 2nd ed. ed.; John Wiley & Sons, Ltd: New York, N.Y., 2004; p 538). Increasing polymer concentration in the polymer solution reduces the solvent volume in the polymer film. Polymer concentration is much higher at the film surface, which results in a denser top layer (see, e.g. Mosqueda-Jimenez et al., Influence of processing conditions on the properties of ultrafiltration membranes. 2004, 231, (1-2), 209-224). Instantaneous demixing can still occur, but the resulting membrane has lower porosity. Table 3 shows the permeability of a polysulfone UF membrane as a function of polymer concentration. As polymer concentration increases, membrane permeability decreases (see, e.g. Chakrabarty et al., Preparation, characterization and performance studies of polysulfone membranes using PVP as an additive. 2008, 315, (1-2), 36-47).

TABLE 3

Pure water flux through polysulfone membranes.

| Polymer Conc. (%) | Flux $(l \cdot m^{-2} \cdot h^{-1})$ |
|---|---|
| 12 | 200 |
| 15 | 80 |
| 17 | 20 |
| 35 | 0 |

System = polysulfone/DMAc/water;
applied pressure = 3 bar;
T = 25° C.

The addition of nonsolvent to the polymer dopant also alters membrane morphology. The presence of nonsolvent in the polymer solution decreases polymer concentration and can shorten liquid-liquid demixing delay. Systems which normally produce nonporous membranes (e.g., CA/acetone/water) can be made to produce porous membranes by adding water to the polymer solution. If there is enough water present in the polymer solution, instantaneous demixing can occur. This can result in a more open membrane structure.

The addition of solvent to the coagulation bath also has an effect on membrane morphology. By adding solvent to the coagulation bath, instantaneous demixing can be stopped. A delay in demixing occurs, which leads to the formation of a nonporous membrane. The addition of solvent to the coagulation bath lowers the polymer concentration at the film interface. This can lead to a more open membrane. By adding a small percentage of solvent to the coagulation bath (3 percent NMP in water) membrane permeability can be increased.

The addition of hydrophilic polymers to the casting solution is another method used to alter membrane morphology. Hydrophilic polymers such as polyethylene glycol (PEG) and polyvinylpyrrolidone (PVP) are added to polymer casting solutions to create more "sponge-like" membranes. These membranes have more pores, less macrovoids, improved pore interconnectivity, and increased hydrophilicity (see, e.g. Chakrabarty et al., Preparation, characterization and performance studies of polysulfone membranes using PVP as an additive. 2008, 315, (1-2), 36-47, Liu et al., Characterization of morphology controlled polyethersulfone hollow fiber membranes by the addition of polyethylene glycol to the dope and bore liquid solution. 2003, 223, (1-2), 187-199, and Chakrabarty et al., Effect of molecular weight of PEG on membrane morphology and transport properties. 2008, 309, 209-221).

D. Illustrative Systems, Devices and Associated Methodological Embodiments of the Invention Illustrative System and Device Elements and Configurations Embodiments of the invention can be adapted for use with a wide variety of systems, devices that use membranes to remove constituents (e.g. particles) from a liquid phase. Consequently, embodiments of the invention can used for drinking water production, wastewater treatment, desalination pretreatment, protein separations, pharmaceutical purification, analytical separations and the like.

Embodiment of the invention include a fluid separation systems and devices. Typically these systems and/or devices comprise a first contained fluid environment; a second contained fluid environment; and a filtration membrane disposed between the first contained fluid environment and the second contained fluid environment so as to form a selectively permeable barrier between these fluid environments. In such fluid separation systems, the membrane is formed from a composition of matter comprising a plurality of polyaniline polymers, wherein the plurality of polyaniline polymers have an average molecular weight of between 1,000 and $1 \times 10^6$ Daltons; and at concentration of at least 11, 12, 13, 14, 15, 16, 17, or 18 weight %, the plurality of polyaniline polymers form a dispersion in a 2-methyl-pyrrolidone (NMP) solvent in the absence of a cosolvent.

Figure 6A:
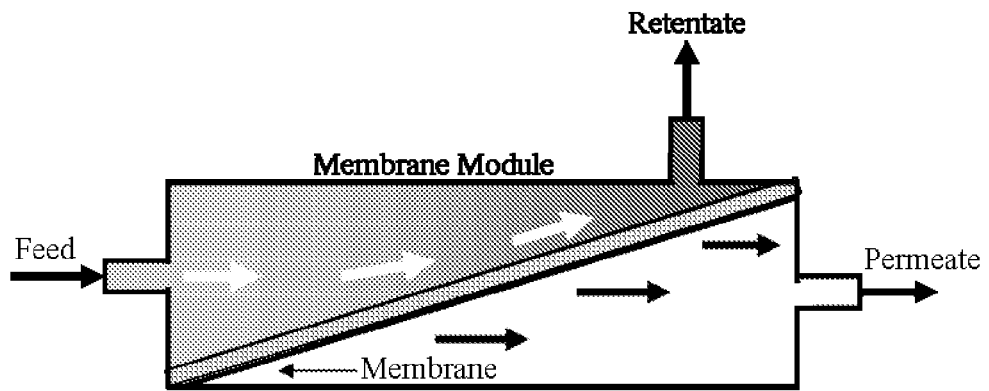
FIG. 6A provides a cross flow membrane filtration schematic.

In many devices that employ membrane filtration, a pressure difference forces liquid to flow through the membrane. Particles suspended in the liquid are retained based on size; particles larger than the filter pores are retained, while smaller particles can pass through the filter. There are three liquid streams in a membrane filtration process: feed, retentate, and permeate. The feed stream enters the membrane module and is composed of liquid and particles. The liquid that passes through the membrane is called permeate, or product. The retained particles and liquid form a concentrated stream called the retentate, or concentrate. These streams are shown in FIG. 6A.

Figure 6B:
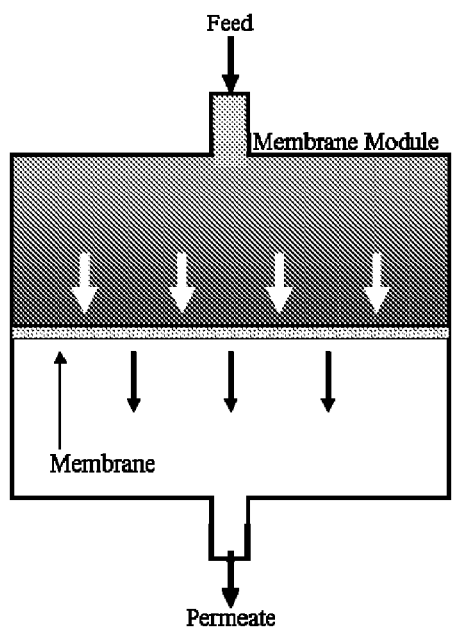
FIG. 6B provides a dead-end membrane filtration schematic.

There are two common flow configurations in membrane filtration devices, cross flow and dead-end configurations. In cross flow filtration, liquid flows tangent to the membrane surface and through the membrane as shown in FIG. 6A. Particles in the feed stream are concentrated as they are retained by the membrane and eventually exit the module. The retentate stream can be recycled or wasted. In dead-end filtration, liquid flows normal to the membrane surface and through the membrane as shown in FIG. 6B. There is no retentate stream in dead-end filtration. Membrane filtration is separated into two classes: microfiltration (MF) and ultrafiltration (UF). Microfiltration and ultrafiltration membranes both retain solutes based on solute size and shape relative to membrane pore size and shape. The transport of solvents through these membranes is directly proportional to transmembrane pressure. Microfiltration and ultrafiltration membranes are separated based on pore size or solute retention. Ultrafiltration membranes are "tighter" than MF membranes; UF membranes have smaller pores and retain smaller particles than MF membranes. Microfiltration membranes have pores ranging in diameter from 0.05 µm to 10 µm, while ultrafiltration membranes have pores ranging from 1 nm to 100 nm in diameter.

Typical Factors Influencing Separation of Particle by Porous Filtration Membranes A number of models, mechanisms and phenomena associated with the use of membranes to separate constituents of liquid mixtures can be used to make, characterize and/or alter various embodiments of the invention. For example, these factors can be considered to make embodiments of the invention having tailored characteristics. A number of these factors are discussed briefly below.

Predominant mechanisms by which particles are retained by porous filtration membranes are (1) pore exclusion, (2) chemical exclusion, and (3) depth filtration. Pore exclusion is the dominant filtration mechanism. Particles much larger than the membrane pores are retained while much smaller particles pass. The transport of particles similar in size to membrane pores is more difficult to track. Real membranes have a range of pore sizes, and particles can vary in shape. Proteins, for example, may change shape when forced through a membrane pore. Ferry developed a model analogous to the interception mechanism in the isolated collector model for granular filtration to describe particle retention by pore exclusion (see, e.g. Ferry, J. D., Statistical evaluation of sieve constants in ultrafiltration. 1936, 20, (1), 95-104). However, this model does not account for attachment efficiency. Ferry's model is based on the assumption that any particle contacting the membrane surface is retained. In laminar flow conditions, particles move parallel to streamlines towards cylindrical membrane pores. Particles impacting pore edges are retained, while those that follow streamlines through the center of pores pass as shown in FIG. 6C.

Figure 6C:
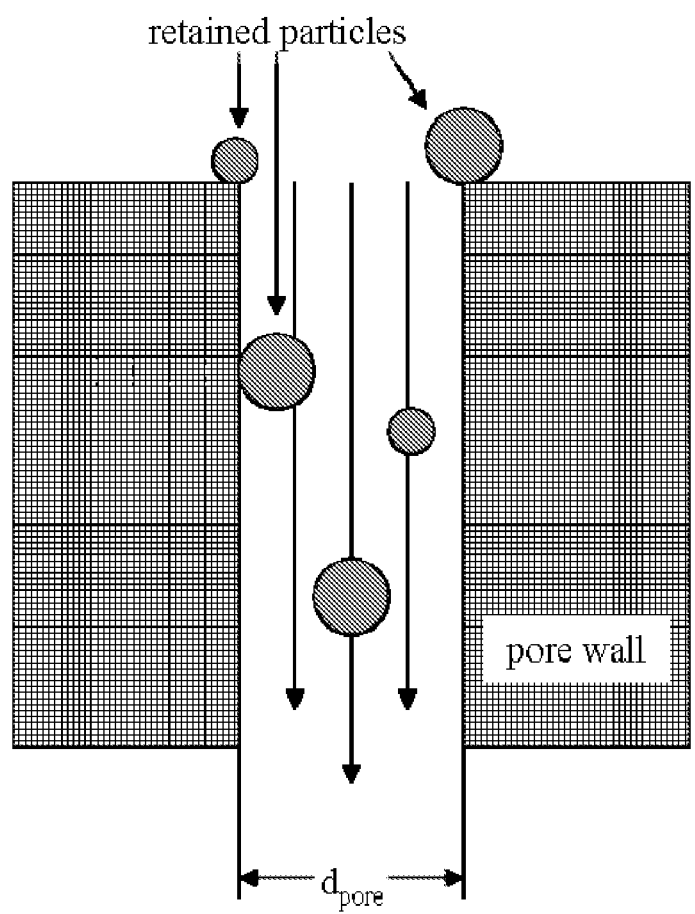
FIG. 6C provides a schematic of particle retention according to Ferry's model.

By the model shown in FIG. 6C, it is possible for particles smaller than the pore to be retained. Particle passage (p) is a function of particle diameter ($d_p$) relative to pore diameter ($d_{pore}$) according to the following equation (Wiesner et al., Principles of Rejection in Pressure-Driven Membrane Processes. In Water Treatment: Membrane Processes, Mallevialle, J. l.; Odendaal, P. E.; Wiesner, M. R., Eds. McGraw-Hill: New York, N.Y., 1996);

$$p = \left\{ \begin{array}{ll} (1-\lambda)^2[2-(1-\lambda)^2]G; & \lambda \leq 1 \\ 0 & ; \lambda > 1 \end{array} \right\},$$

where $\lambda = d_p/d_{pore}$ and G is the lag coefficient empirically determined by Zeman and Wales (see, e.g. Zeman, L.; Wales, M., Polymer Solute Rejection by Ultrafiltration Membranes. In Synthetic Membranes, Vol. II. Hyper and Ultrafiltration Uses, Turbak, A. F., Ed. American Chemical Society: Washington D.C., 1981) to be $$G = \exp(-0.7146\lambda^2).$$

Pore size may be altered during the filtration process by pore blocking. Spherical particles larger than spherical pores ($\lambda > 1$) can cause complete pore blocking. Smaller non-spherical particles can partially block pores at the membrane surface or on the membrane walls. This results in pore restriction and alters the rejection properties of the membrane.

Filtration membranes may also retain particles by a chemical exclusion mechanism. Physicochemical interactions between particles and membrane surfaces lead to particle retention in two ways: 1) particle adsorption to membrane surfaces, or 2) particle repulsion and subsequent exclusion from membrane pores (see, e.g. Probstein, R. F., Physicochemical Hydrodynamics. 2nd ed.; John Wiley & Sons, Inc.: Hoboken, N.J., 2003). Solution and particle surface chemistries play a large role in chemical exclusion. Particles are attracted to membrane surfaces by van der Waals forces. Temporary polarization caused by the constant movement of electrons or permanent dipoles result in an uneven distribution of charge between two species, which induces a long range attractive force which decays as a function of separation distance up to about 10 nm. Beyond 10 nm, van der Waals forces decay as a function of the square of separation distance (see, e.g. van Oss, C. J., Long-range and short-range mechanisms of hydrophobic attraction and hydrophilic repulsion in specific and aspecific interactions. 2003, 16, (4), 177-190 and Israelachvili, J. N., Intermolecular and Surface Forces. Academic Press: New York, N.Y., 1991). Van der Waals forces can lead to adsorption of particles to membrane surfaces. Electrostatic interaction between surfaces is caused by the overlap of electrical double layers. This force is felt in a range of 1-100 nm, decays exponentially with distance, is attractive (repulsive) when surfaces (e.g., particles and membrane) have opposite (like) charge. Repulsive electrostatic forces may be large enough to exclude particles from entering membrane pores (see, e.g. Deen, W. M., Hindered Transport Of Large Molecules In Liquid-Filled Pores. 1987, 33, (9), 1409-1425, Causserand et al., Proteins transport through charged porous membranes. 1996, 74, (A1), 113-122, Pujar et al., Electrostatic And Electrokinetic Interactions During Protein-Transport Through Narrow Pore Membranes. 1994, 33, (10), 2473-2482, and Bhattacharjee et al., Membrane interactions in Ultrafiltration. 1996, 35, (9), 3108-3121). In high ionic strength solutions, the electrical double layers of surfaces are shortened. In the case of like-charged particles and membranes, the compression of electrical double layers allows particles to approach membrane surfaces at a closer distance before feeling electrostatic repulsion. Particle and membrane surface potentials further decrease as solution pH approaches the isoelectric point of either particle or membrane. As surfaces lose charge, particles can approach membrane surfaces more closely. Hydrophilic/hydrophobic forces are felt at ranges of less than 10 nm. Hydrophilic particles may be excluded from adhering to a membrane due to adsorbed water layers on each surface. Adsorbed water layers are strongly bound to hydrophilic surfaces and do not allow these surfaces to approach close enough for adhesion to occur. Hydrophobic particles may be forced onto membrane surfaces by water and thus be retained by filtration membranes by adsorbing to membrane surfaces.

Figure 6D:
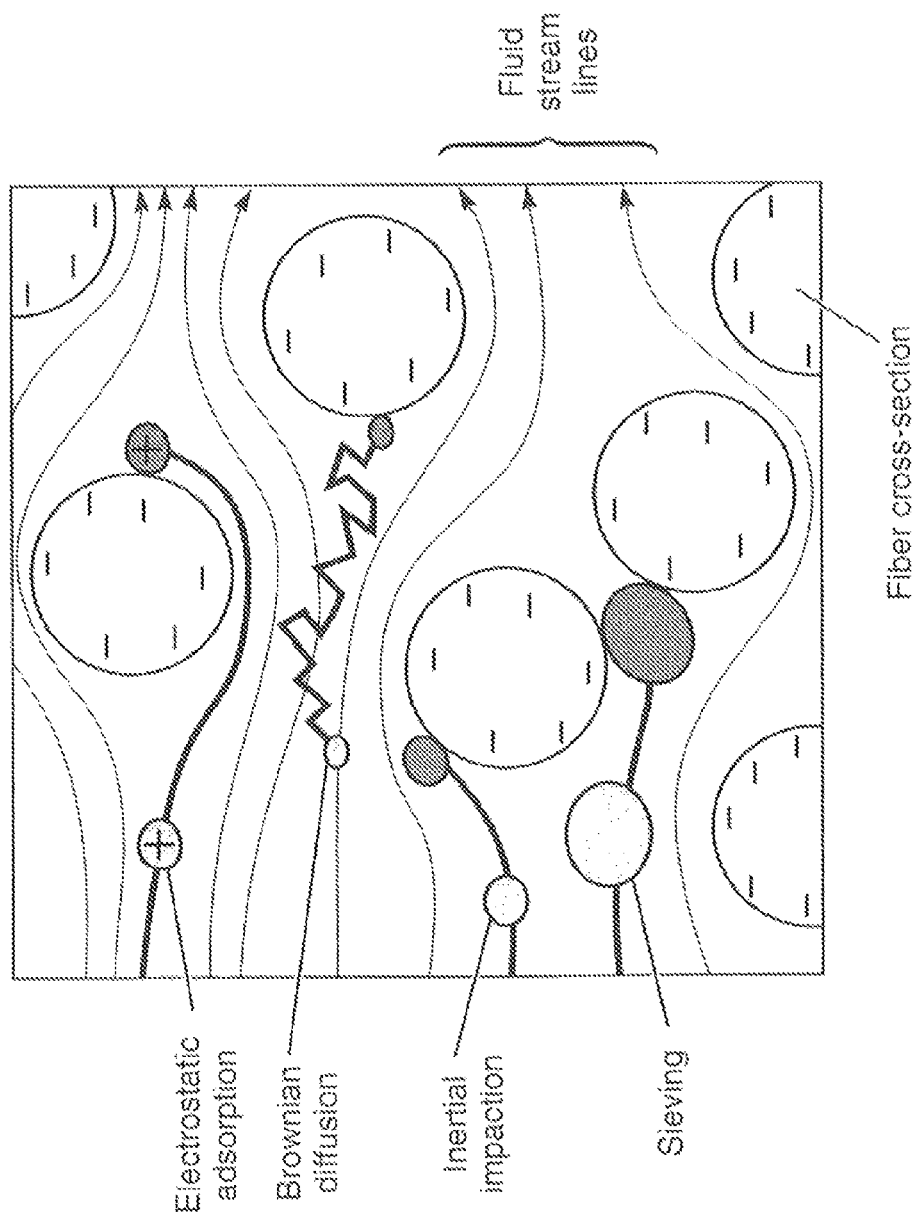
FIG. 6D provides a schematic of a particle capture mechanism in filtration of liquid solutions by depth microfilters. Four capture mechanisms are shown: simple sieving; electrostatic adsorption; inertial impact; and Brownian diffusion (see, e.g. Baker, R. W., Membrane Technology and Applications. 2nd ed. ed.; John Wiley & Sons, Ltd: New York, N.Y., 2004; p 538). Captured particles are shown in dark grey.

Depth filtration through the membrane cross-section is another mechanism for particle removal by filtration membranes. FIG. 6D provides a schematic of a simplified depiction of a filtration membrane pore. In reality, filtration membrane pores are not uniform cylindrical channels running straight through the membrane cross-section. Membrane pore diameters are not uniform. Pores are often interconnected and follow a tortuous path, which increases effective pore length. Longer pores increase the chance of particle attachment to pore walls by diffusion or collision as shown in FIG. 6D. Winding pores cause abrupt changes in solvent flow direction. Dense particles are unable to follow streamlines due to inertial effects and can adsorb to pore walls due to polymer-particle affinity.

As stated earlier, membrane pore size is the dominant factor in determining the rejection characteristics of a filtration membrane. The pore size of a filtration membrane can be described by the membrane's ability to retain solutes or particles of a given size or molecular weight. The term molecular weight cut-off is used to relate the size of a protein that would be retained, or almost completely retained, by a given membrane to that membrane's pore size (see, e.g. Cheryan, M., Ultrafiltration and Microfiltration Handbook. Technomic Publishing Company, Inc.: Lancaster, Pa., 1998). Molecular weight cut-off is determined by performing rejection tests using solutes or globular proteins of known sizes with the membrane of interest. These test solutes can ideally be soluble in water or in a mildly buffered solution, cover a wide range of sizes, and should not adsorb to the membrane surface. Solutes such as sodium chloride (MW=58.5 Da) and glucose (MW=180 Da) are commonly used to cover the low end of the molecular weight range. Large proteins such as immunoglobulins (MW>900 kDa) are used for rejection tests of high molecular weight solutes. Solutes with intermediate sizes/molecular weights are used to complete the molecular weight cut-off test. Several solutes with molecular weights near the membrane's anticipated molecular weight cut-off can be included in the analysis. The following figure shows a general relationship between membrane pore size, solute molecular weight, and solute rejection.

Figure 6E:
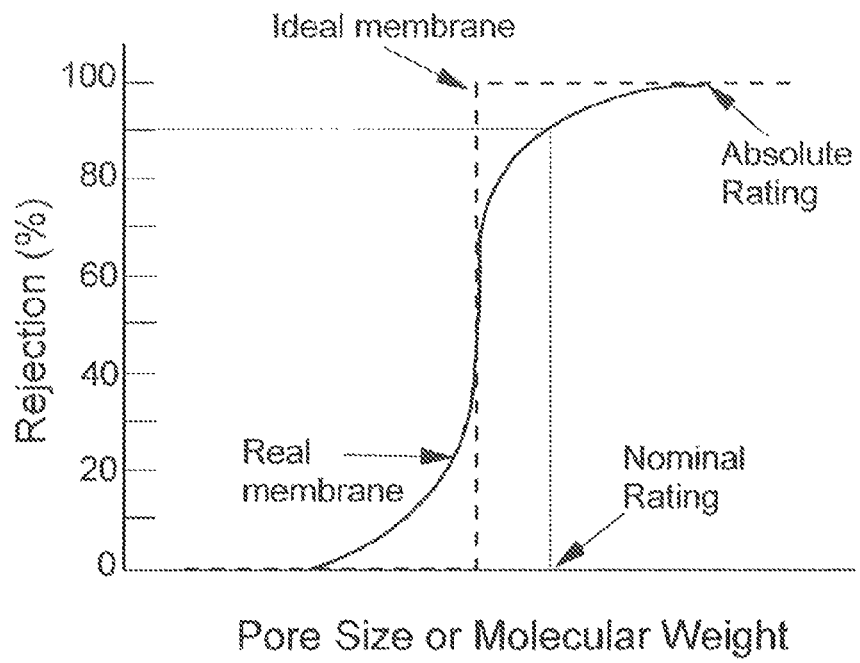
FIG. 6E provides a graph showing the relationship between pore size, molecular weight of ideal solutes, and ratings of ideal and real membranes.

In FIG. 6E, the sharp curve (dashed line) in the figure above represents the pore size distribution of an ideal membrane. An ideal membrane has a very narrow pore size distribution, and such a membrane has never been seen in practice. The molecular weight cut-off for an ideal membrane is very sharp because of the narrow pore size distribution. Real membranes have broader pore size distributions and molecular weight cut-offs. By convention, microfiltration membranes are given "absolute ratings", which are based on the largest pore on the membrane surface. Absolute rejection means that 100 percent of a solute of a given molecular weight is retained. Ultrafiltration membranes are assigned "nominal ratings." The nominal molecular weight cut-off of an ultrafiltration membrane corresponds to the molecular weight of a solute that is 90 percent retained.

There is no standard method for the characterization of solute rejection by filtration membranes. Several conditions can be standardized including transmembrane pressure, test solutes, temperature, stirring rate or cross flow velocity, solute concentration, buffer system, ratio of volume of test solution to membrane surface area, permeate-to-feed ratio, or membrane pretreatment. Cheryan recommends the following conditions: (1) pressure of 100 kPa; (2) temperature of 25° C.; (3) maximum possible mass transfer to minimize concentration polarization; (4) low solute concentrations (e.g., 0.1 percent); (5) individual solutes in water or mildly buffered solution; (6) 200 ml of solution in a dead-end cell using 47-62 mm diameter membranes (18-29 $cm^2$ surface area); (7) removal of less than 10 percent of the solution as permeate to avoid concentration effects; and (8) the membrane should be new and clean. Several commonly used test solutes are listed in Table 4 below. In certain embodiments of the invention, the permeability of the membrane is selected to modulate the diffusion of constituents having a certain molecular weight (e.g. above or below the molecular weight of bovine serum albumin or another agent disclosed in Table 4).

TABLE 4

Common test solutes used to characterize ultrafiltration membranes.

| Species | Molecular weight (×100) | Estimated molecular diameter (Å) |
|---|---|---|
| Sucrose | 0.34 | 11 |
| Raffinose | 0.59 | 13 |
| Vitamin $B_{12}$ | 1.36 | 17 |
| Bacitracin | 1.41 | 17 |
| Insulin | 5.7 | 27 |
| Cytochrome c | 13.4 | 38 |
| Myoglobin | 17 | 40 |
| α-Chymotrysinogene | 25 | 46 |
| Pepsin | 35 | 50 |
| Ovalbumin | 43 | 56 |
| Bovine albumin | 67 | 64 |
| Aldolase | 142 | 82 |
| γ-Globulin | 150 | 84 |

Pressure-Driven Flow Through Porous Filtration Membranes

Several models have been developed in an attempt to relate membrane properties and operating conditions to fluid flow through porous membranes. Fluid flow through membranes is induced by some driving force. In the case of filtration membranes, fluid flow is caused by a pressure difference across the membrane. The following is a general expression relating pressure to fluid flux:

$$J_v = -A \frac{dp}{dx},$$

where $J_v$ is fluid flux (volumetric flow per unit area), A is a phenomenological coefficient, p is pressure, and x is distance. This expression is further simplified by remembering that flow through porous filtration membranes is directly proportional to pressure. The following equation relates fluid flux to pressure drop ($\Delta p$) with a permeability coefficient ($L_p$);

$$J_v = L_p \Delta p.$$

Figure 6F:
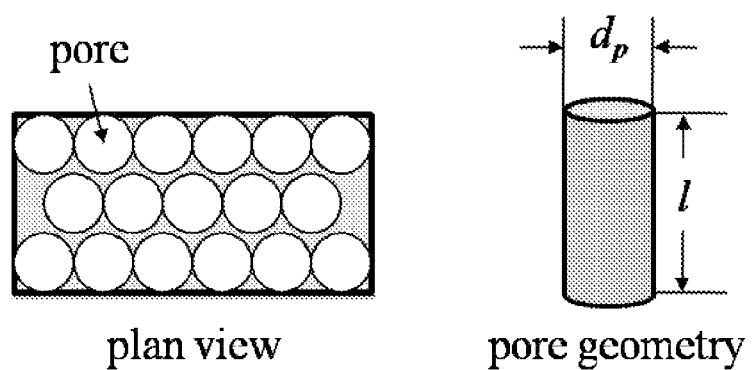
FIG. 6F provides a schematic of a membrane modeled as an array of cylindrical channels (left) and a pore with diameter, dp, and length, l, (right).

In an ideal filtration membrane, pores are evenly distributed on the membrane surface and have uniform diameters. The Hagen-Poiseuille model for flow through porous membranes assumes that an ideal membrane can be modeled as an array of straight, cylindrical channels as depicted in FIG. 6F. In FIG. 6F, it is assumed that the inter-channel space is a solid phase, which is impermeable to the fluid. This model relates applied pressure, pore diameter, porosity, and fluid viscosity to fluid flux. The model is derived by solving a momentum balance of flow through capillaries (see, e.g. Bird et al., Transport Phenomena. Wiley: New York, N.Y., 1960). The most applicable form of the Hagen-Poiseuille (HP) model for membrane filtration is given below $$J_v = \frac{\varepsilon d_p^2}{32 \, \mu l} \Delta p, \; (HP)$$

where $\varepsilon$ is porosity, $d_p$ is pore diameter, $\mu$ is fluid dynamic viscosity, l is membrane thickness, and $\Delta p$ is the applied transmembrane pressure. If the filtration membrane is asymmetric, then $\varepsilon$ is surface porosity, $d_p$ is pore diameter, $\mu$ is solution dynamic viscosity, l is membrane skin thickness, and $\Delta p$ is the pressure drop across the skin layer. A tortuosity term can be added to the equation above to help account for the winding flow paths often found in real membranes. The pore length, l, is multiplied by pore tortuosity, $\tau$. Tortuosity is the ratio of the real pore length to membrane thickness (symmetric membrane) or skin thickness (asymmetric membrane), $l_{real}/\Delta x$. Tortuosity may be approximated from membrane porosity by the following relation:

$$\tau = \ln(1-\varepsilon^2).$$

By expressing equation HP in terms of $L_p$ and $\Delta p$, it is apparent that membrane permeability is proportional to $\varepsilon \cdot d_p^2 \cdot (\tau \cdot l)^{-1}$.

Figure 6G:
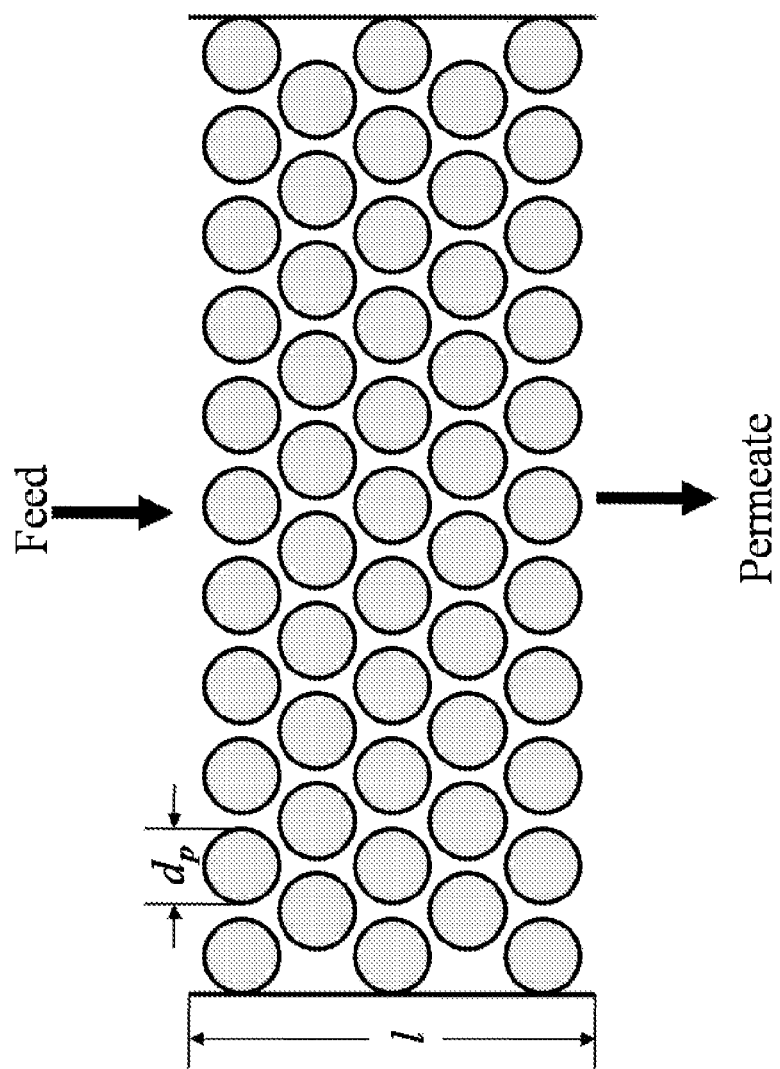
FIG. 6G provides a schematic of a cross section of a filtration membrane modeled as a packed bed of spherical particles.

Kozeny and Carman developed a model to describe laminar flow through porous media (see, e.g. a b McCabe, Warren L.; Smith, Julian C.; Harriot, Peter (2005), Unit Operations of Chemical Engineering (seventh ed.), New York: McGraw-Hill, pp. 163-165). In the Kozeny-Carman model, a porous filtration membrane is represented as a packed bed of spherical particles as shown in FIG. 6G. In FIG. 6G, $d_p$ is the particle diameter and l is the membrane thickness. Membrane permeability according to the Kozeny-Carman model is expressed as $$L_p = \frac{\varepsilon^3}{KS^2(1-\varepsilon)^2 \mu l},$$

where $\varepsilon$ is membrane porosity, K is the Kozeny coefficient, S is particle specific surface area, $\mu$ is fluid dynamic viscosity, and l is membrane thickness. The Kozeny coefficient has been found to vary with particle volume fraction as shown in Table 5 below:

TABLE 5

Kozeny coefficient as a function of particle volume fraction.

| Concentration (1 − $\varepsilon$) (v/v) | Kozeny coefficient (K) |
|---|---|
| <0.1 | 23 |
| 0.1-0.2 | 20 |
| 0.2-0.3 | 15 |
| 0.3-0.4 | 10 |
| >0.4 | 5 |

The specific surface area, S, of a spherical particle is $6/d_p$. Membrane permeability according to the Kozeny-Carman model can be expressed as $$L_p = \frac{\varepsilon^3 d_p^2}{36K(1-\varepsilon)^2 \mu l}.$$

As in the Hagen-Poiseuille model, membrane permeability is approximately proportional to $\varepsilon \cdot d_p^2 \cdot l^{-1}$.

Figure 16A:
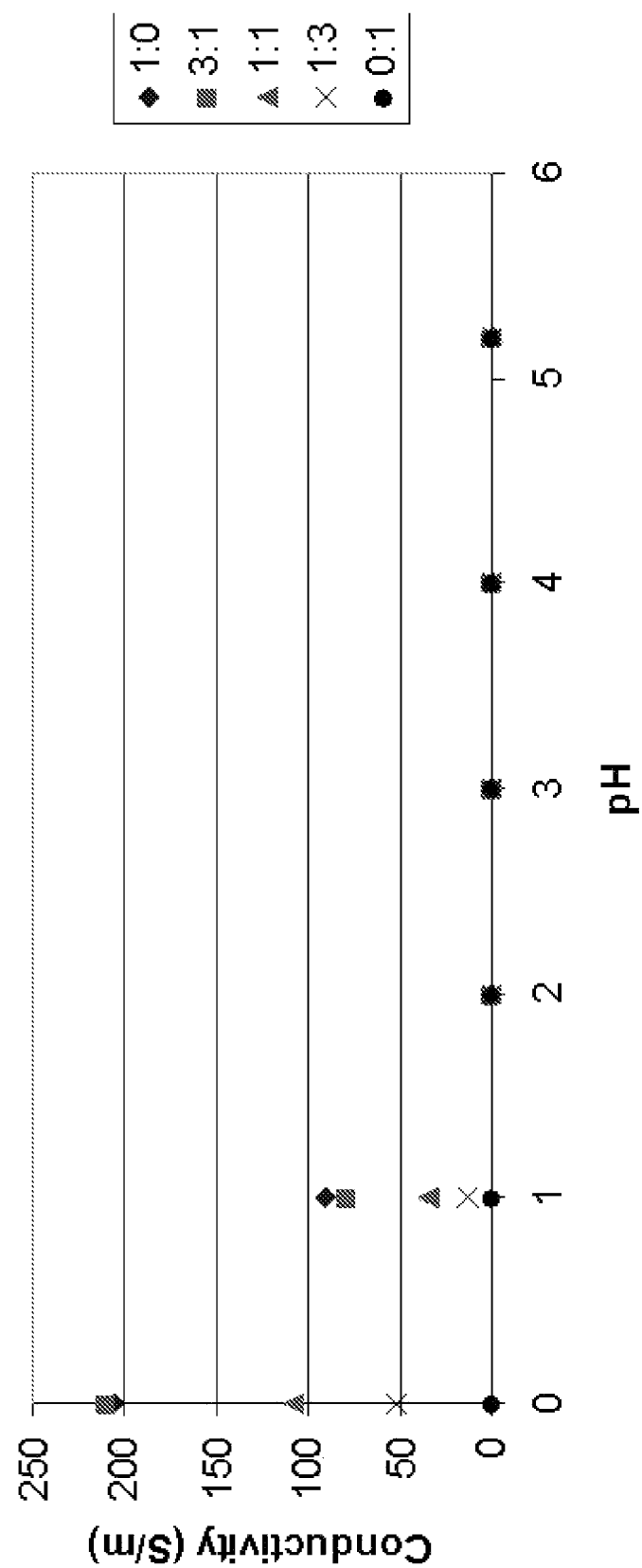
FIG. 16A provides a schematic of a system for characterizing membrane electrical conductivity.
Figure 16B:
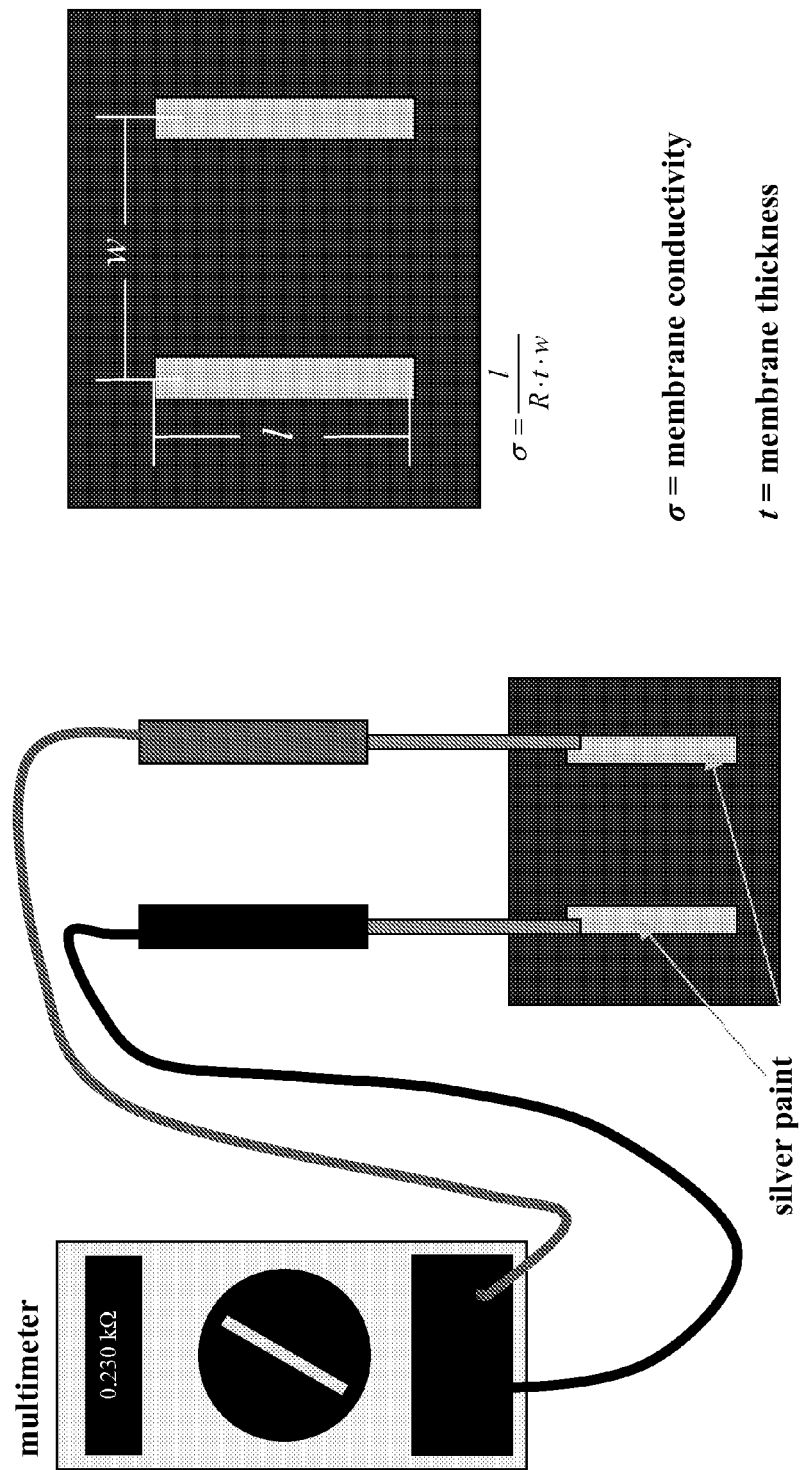
FIG. 16B shows a graph of the electrical conductivity of various polyanlinine and polyaniline/polysulfone compositions.
Figure 17:
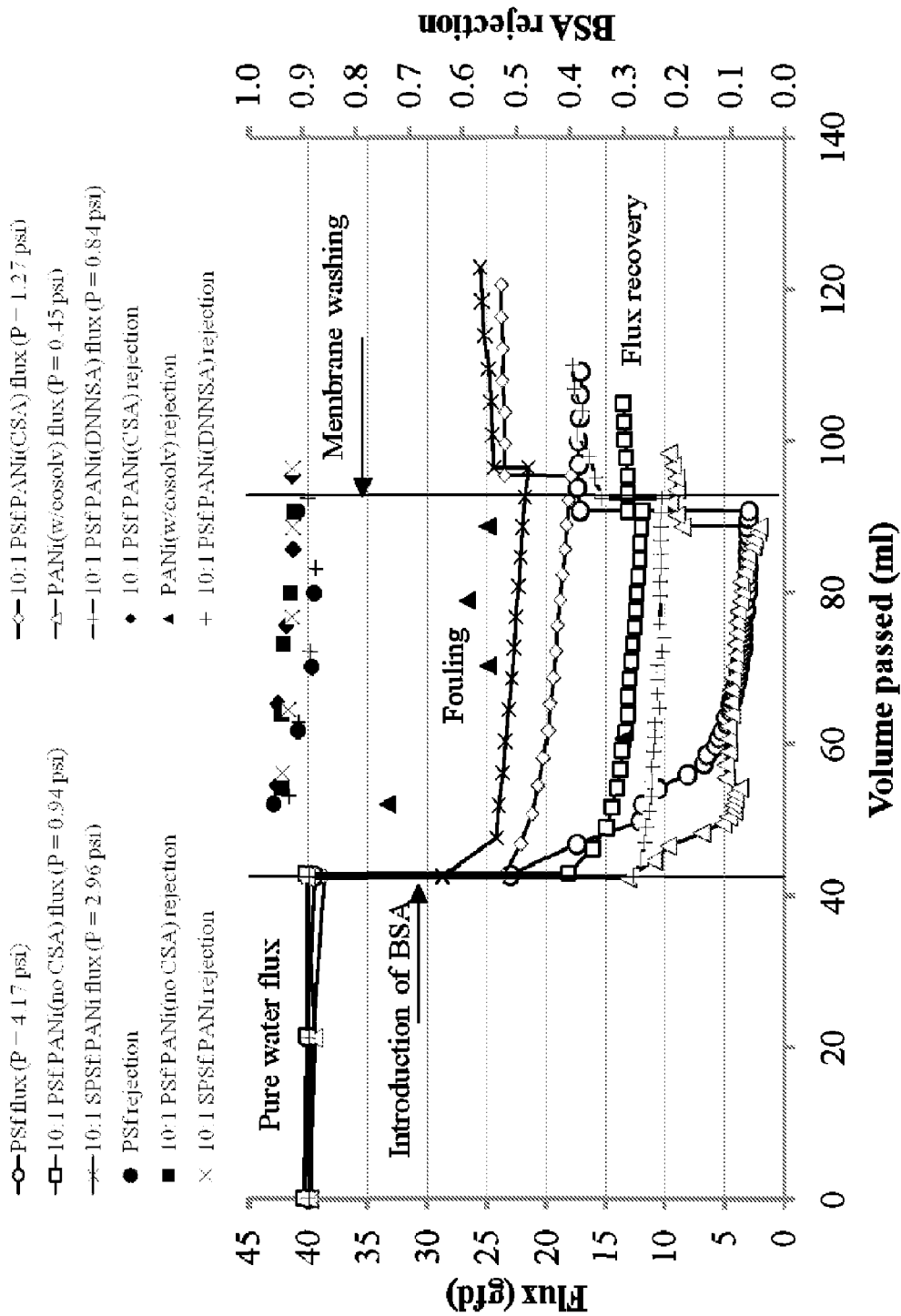
FIG. 17 shows a graph of flux data obtained from of various polyanlinine and polyaniline/polysulfone compositions.

Conducting Membranes with Tunable Solute Selectivity and Improved Fouling resistance Embodiments of the invention include polyaniline compositions that are electrically conductive. FIG. 16A illustrate aspects of systems designed to characterize electrically conductive membranes. FIG. 16B provides a graph showing the electrical conductivity of various membrane compositions. In certain embodiments, the charged solute selectivity may be modulated or "tuned" using electrically conducting membranes. Tunable solute selectivity can be demonstrated by passing variable electric potentials through the conducting membranes, thus giving rise to variable in-pore electrical potentials. Support for this is provided in the equation below, which describes the combined effects of (hindered) convection, (hindered) diffusion, and electro-migration on steady-state charged solute transport through a charged nanopore (see, e.g. Probstein, R. F., Physicochemical Hydrodynamics: An Introduction. 2nd ed.; John Wiley & Sons, Inc.: Hoboken, 2003; p 267-270).

$$j_i = K_{i,c} J_v c_i - K_{i,d} D_{i,\infty} \frac{\partial c}{\partial y} - \frac{z_i F c_i}{k_B T} K_{i,d} D_{i,\infty} \frac{\partial \psi}{\partial y}$$

This is the "extended Nernst-Planck" equation, where $j_i$ represents the ionic solute flux, $c_i$ represents the intra-pore ion concentration, $z_i$ is the ionic charge number, F is the Faraday constant, and $\Psi$ is the membrane in pore and interfacial electrical potential (see, e.g. Bhattacharjee et al., Environ. Eng. Sci. 2002, 19, (6), 399-412). The parameters $K_{i,d}$ and $K_{i,c}$ are the diffusive and convective hindrance factors in the pore, respectively (see, e.g. Bowen et al., J. Membr. Sci. 1996, 112, (2), 263-274). The membrane surface concentrations at the feed and permeate sides are traditionally related to the corresponding intra-pore concentrations through a combined Donnan-steric partition coefficient, where the Donnan potential is related to the membrane charge density (potential) and the bulk ion concentrations (see, e.g. Bhattacharjee et al., AIChE J. 2001, 47, (12), 2733-2745).

In the case of electrically conducting membranes, the externally applied electrical potential contributes to the charge density and total electrical potential of the membrane ($\psi = \psi_{app} + \psi_{mem}$, where $\psi_m$ is the in-pore electrical potential due to the membrane's chemical functionality and $\psi_{app} = \sigma_{app} \lambda_{EL} / \epsilon_0 \epsilon_r$, and $\sigma_{app}$ is the charged density stored in the membrane upon application of the applied external electric field, see. e.g. Poortinga, A. T. Electric double layer interactions in bacterial adhesion and detachment. Ph.D. Thesis, University of Groningen, Groningen, The Netherlands, 2001). Electro-active membranes in contact with an external power source will exhibit tunable electrical potentials, and thus, tunable ion transport (rejection) not possible with conventional membranes.

In classical electro-filtration processes, an electric field is applied across the membrane or the membrane itself can be the electrode, (see, e.g. Huotari et al., Chem. Eng. Res. Des. 1999, 77, (A5), 461-468, Elzo et al., Colloid Surf. A-Physicochem. Eng. Asp. 1998, 138, (2-3), 145-159, and Guizard et al., J. Membr. Sci. 1989, 41, 127-142). Some investigators have reported significant enhancements for removal of arsenic, organic acids, humic acid, biopolymers, and Cryptosporidium with electro-ultrafiltration or electro-nano-filtration (see, e.g. Kulkarni et al., Water Res. 2005, 39, (6), 1047-1060, Lapointe et al., Biotechnol. Bioeng. 2006, 94, (2), 223-233, Park, Y. G., Desalination 2006, 191, (1-3), 404-410, Weng et al., Water Res. 2006, 40, (9), 1783-1794, Noel et al., Desalination 2000, 129, (2), 125-136, and Noel et al., Desalination 2003, 155, (3), 243-254). Other past studies compared the efficacy of continuous and pulsed electric fields for control of particle deposition and cake formation, (see, e.g. Bowen et al., Chem. Eng. Commun. 1991, 110, 199-216, and Park et al., J. Ind. Eng. Chem. 2005, 11, (5), 692-699) or for cleaning fouled membranes (see, e.g. Bowen et al., Aiche J. 1997, 43, (4), 959-970, Bowen et al., Ind. Eng. Chem. Res. 1992, 31, (2), 515-523, and Ahmad et al., Sep. Purif. Technol. 2002, 29, (2), 105-112). The improved fouling control in the cross-flow membrane electro-filtration (CMEF) process can be due to enhanced electro-phoretic, electro-osmotic, electrostatic phenomena as well as various electro-chemical reactions occurring at the electrodes (see, e.g. Saveyn et al., Chem. Eng. Sci. 2005, 60, (23), 6768-6779).

Electrofiltration Experiments

Certain embodiments of the invention involve electrically conductive polyaniline compositions as disclosed herein. FIG. 16A illustrate aspects of systems designed to characterize electrically conductive membranes. FIG. 16B provides a graph showing the electrical conductivity of various membrane compositions.

Figure 7A:
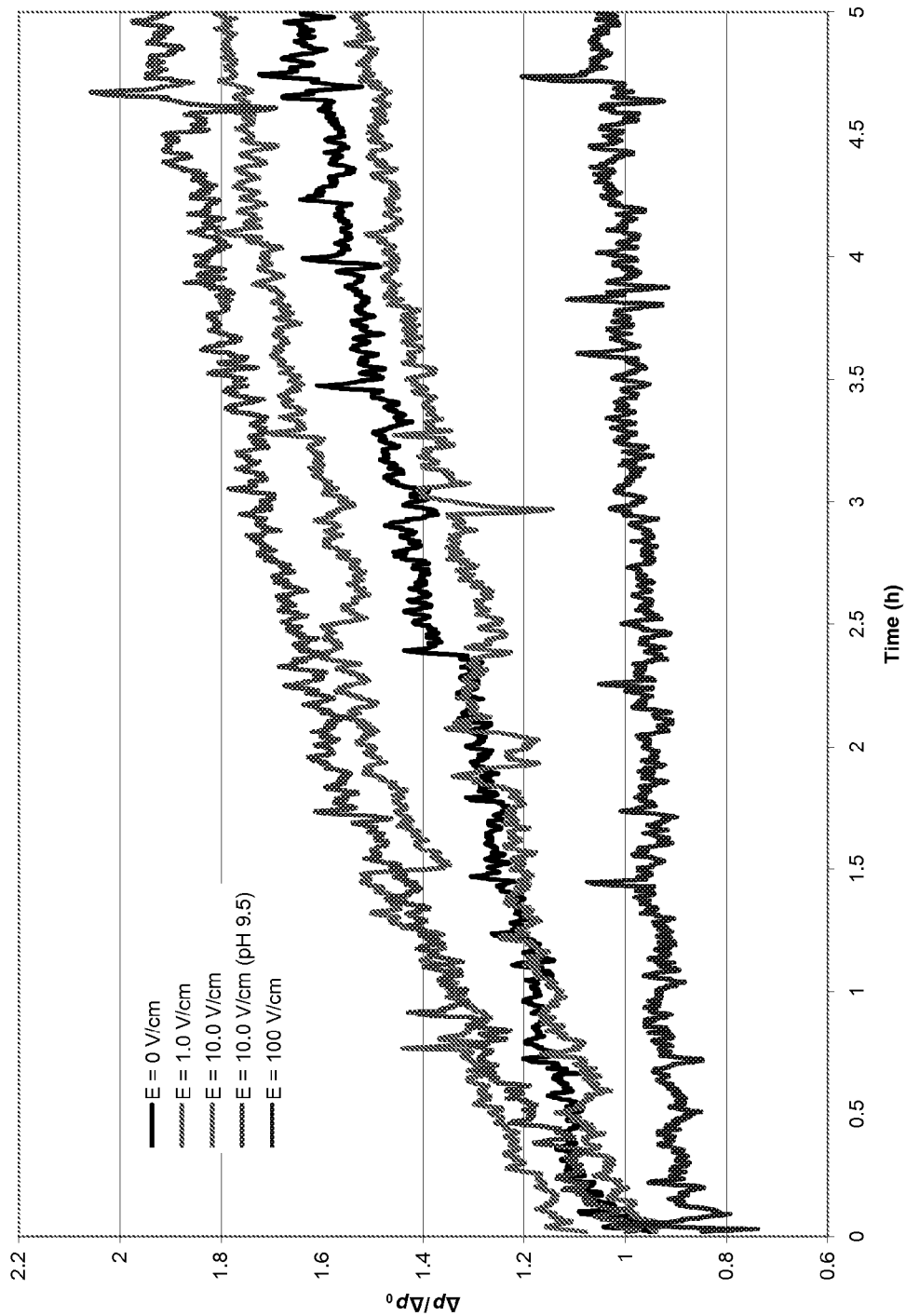
FIG. 7A provides a graph showing normalized transmembrane pressure over time for different field strengths.

Electro-filtration crossflow membrane modules were constructed to evaluated polymer (e.g. polysulfone) membranes with a conducting backing material to produce and electric field. In one exemplary illustration of this, electrofiltration experiments were performed using 18 wt % polysulfone (in NMP) membranes supported by a steel permeate spacer. Temperature was held constant at 25° C., and the pH was unadjusted (~5.4). SNOWTEX 20-L silica nanoparticles ($d_p$=40-50 nm) were added to the feed water at a concentration of 200 mg/l. The electrofiltration system operated with a constant flux of 40 gfd and a constant Reynolds number of 112. Feed and permeate turbidity, pH, and conductivity were measured throughout the experiments. The development of normalized transmembrane pressure over time is plotted in FIG. 7A for different electric field strengths.

Experiments were performed using constant applied electrical field strengths of 0, 1, 10, and 100 V/cm. There was little effect on transmembrane pressure drop when the electric field strength was 10 V/cm or lower. When a field strength of 100 V/cm was applied, the transmembrane pressure showed little increase over time indicating a decrease in fouling rate. An additional experiment was performed at pH 9.5 with a field strength of 10 V/cm to see if an increase in particle zeta potential had an effect on particle mobility. Transmembrane pressure increased over time, which indicated that the fouling rate was similar to the experiment conducted at unadjusted pH and 10 V/cm.

Figure 7B:
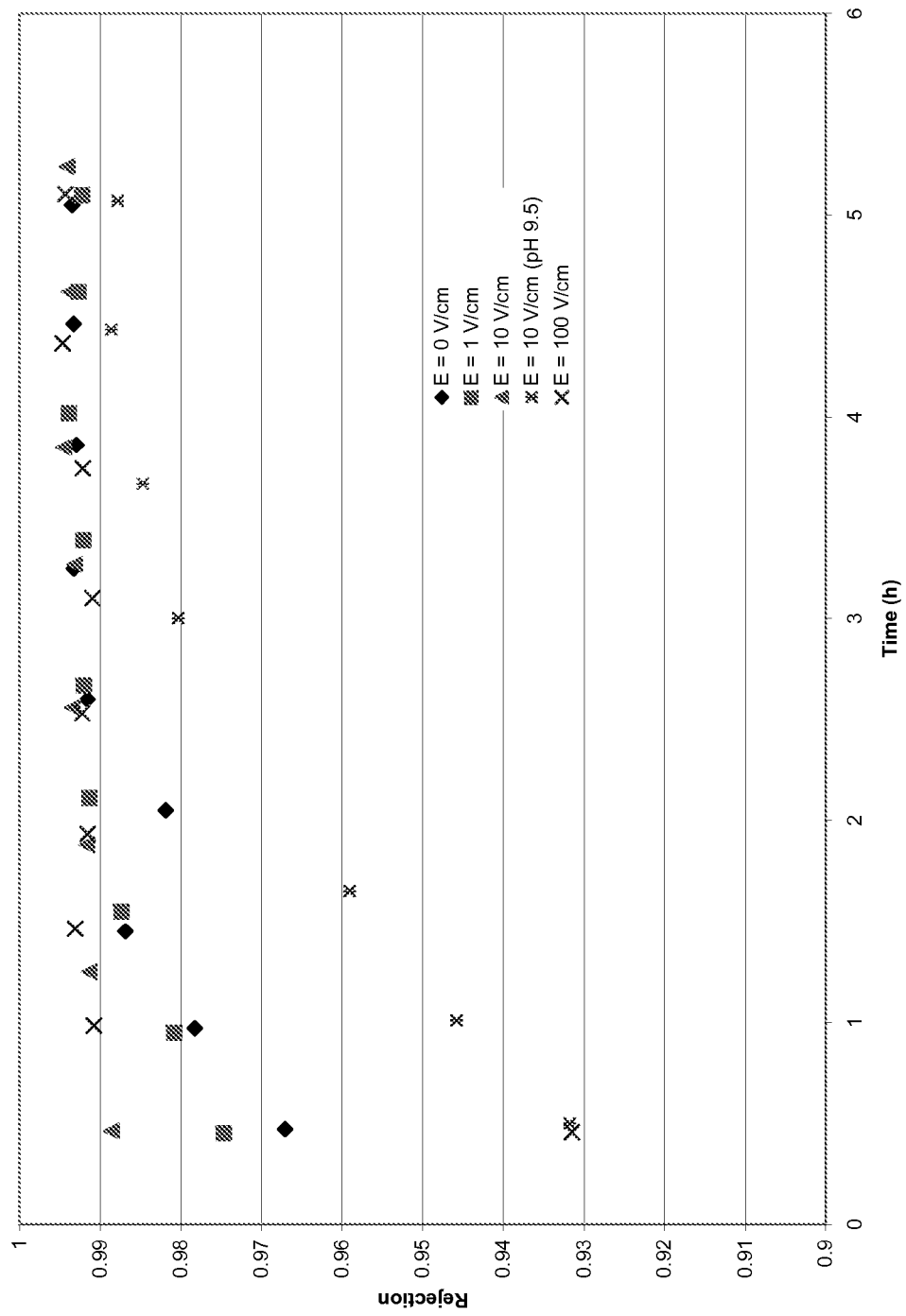
FIG. 7B provides a graph showing silica nanoparticle rejection over time for different field strengths.

Silica nanoparticle rejection measured over the course of these experiments is plotted in FIG. 7B. There is little difference in silica rejection beyond 3 hours after which rejection is greater than 99 percent for all applied field strengths with the exception of the experiment conducted at pH 9.5. The particles may be more stable at this higher pH, and thus may be less prone to form aggregates.

Figure 7C:
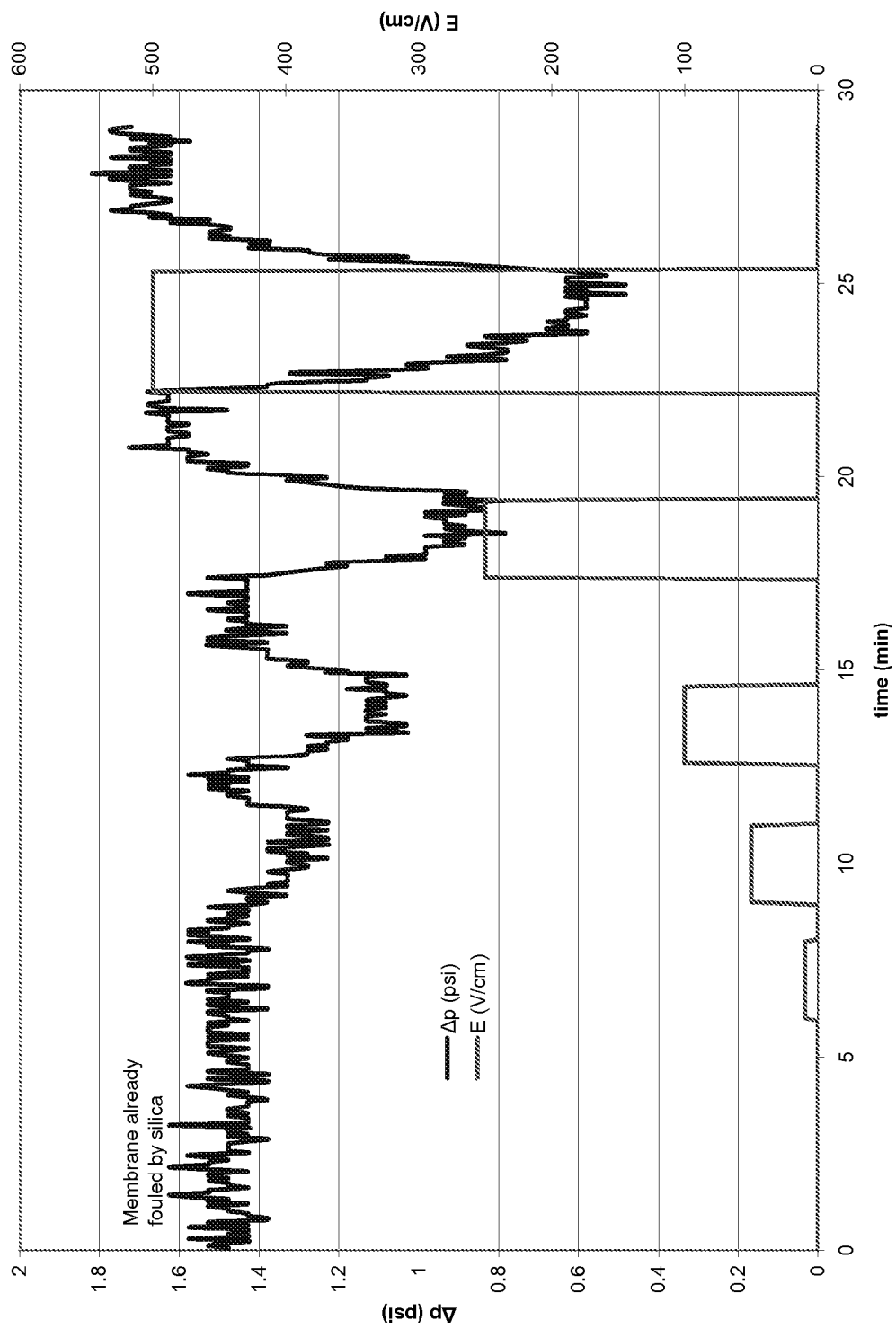
FIG. 7C provides a graph showing transmembrane pressure and applied field strength over time.

Additional experiments were conducted to see if there are any effects of a pulsed electric field on the transmembrane pressure of an already-fouled membrane. One experiment was conducted after the pH 9.5, E=10 V/cm experiment discussed in the previous section, so all of the operating parameters are identical. Electrical pulses of 10, 50, 100, 250, and 500 V/cm were applied for two minutes each. Transmembrane pressure and field strengths are plotted over time in FIG. 7C. No response in transmembrane pressure was detected for a field strength of 10 V/cm. Field strengths above 10 V/cm showed an increasing response in transmembrane pressure. As the pulsed electrical potential increased, the transmembrane pressure decreased. However, once the potential was turned off, the transmembrane pressure returned to the original value of about 1.5 psi. In the case of 250 and 500 V/cm, the transmembrane pressure returned to a slightly higher value of 1.6 and 1.7 psi, respectively.

The following example is given to aid in understanding the invention, but it is to be understood that the invention is not limited to the particular materials or procedures of this example.

EXAMPLE

Example 1

Structural, Morphological, and Separation Properties of Polyaniline and Polyaniline-Polysulfone Composite Membranes As noted above, the conducting polymer, polyaniline (PANi) has been studied for use in numerous applications including battery electrodes, (see, e.g. Desilvestro et al., J. Electrochem. Soc., 1992, 139, 2727-2736) electromagnetic shielding devices, (see, e.g. Joo et al., Appl. Phys. Let., 1994, 65, 2278-2280 and Trivedi et al., Synth. Met., 1993, 59, 267-272) and anticorrosion coatings (see, e.g. Alam et al., Polym. Adv. Technol., 2008, 19, 882-888, Lu et al., Synth. Met., 1995, 71, 2163-2166 and Yao et al., Mat. Lett., 2008, 62, 1775-1778). Interest in polyaniline has continued to grow due to its flexibility, electrical conductivity (when doped), relatively simple synthesis, and the low cost of aniline (see, e.g. Feast et al., Polymer, 1996, 37, 5017-5047). More recently, polyaniline has been studied as a membrane material (see, e.g. Ball et al., J. Membr. Sci., 2000, 174, 161-176, Ball et al., Synth. Met., 1999, 102, 1311-1312, Huang et al., Macromolecules, 1998, 31, 5456-5464, Ball et al., Synth. Met., 1997, 84, 799-800, Su et al., Synth. Met., 1997, 84, 801-802, Anderson et al., Science, 1991, 252, 1412-1415, and Huang et al., J. Am. Chem. Soc., 2003, 125, 314-315). Fan et al. showed that blending polyaniline into polysulfone ultrafiltration membranes can improve performance, specifically higher permeability and lower fouling potential probably due to increased hydrophilicity (see, e.g. Fan et al., Membr. Sci., 2008, 310, 402-408 and Fan et al., J. Membr. Sci., 2008, 320, 363-371).

As disclosed in this Example, a highly processable form of polyaniline having new material properties has been synthesized. In addition, this new material has been blended with polysulfone to create mixed-matrix membranes by nonsolvent induced phase inversion. Membranes containing only polyaniline were 10 times more permeable than polysulfone containing blends. Increasing polyaniline content increased membrane pore size and hydrophilicity. Scanning electron micrographs revealed stark differences in membrane skin-layer thickness and pore-structure as well as sub-layer macrovoid morphology. The addition of polyaniline to polysulfone appeared to increase membrane pore size, decrease skin layer thickness, and increase hydrophilicity, which produces differences in observed membrane separation performance.

Polyaniline solutions in 2-methyl-pyrrolidone solvent form a gel at concentrations higher than 10 wt %. This 10 wt % concentration threshold for the formation of a polyaniline gel can be problematical in situations where higher concentrations polyaniline are needed, but a gel form of this composition is not desirable. For example, concentrated solutions are needed if polyaniline is to be used in fiber spinning and conventional film casting techniques. Yang et al. have shown that the addition of secondary amine cosolvents to 2-methyl-pyrrolidone (NMP) solvent allows for the dissolution of high MW polyaniline to concentrations in excess of 15 wt %, which is about the minimum concentration required for formation of ultrafiltration membranes by the phase inversion technique (see, e.g. Dali Yang, The Dissolution of High Molecular Weight Polyaniline Emeraldine Base in N-Methyl-2-Pyrrolidinone Containing Secondary Amines: Thermodynamics and Characterization (1999), (Ph.D. dissertation, University of California, Los Angeles). However, the use of cosolvents is not desirable in that these additional organic compounds typically increase production costs, makes this process less environmentally friendly and more difficult to safely scale up. For additional publications that describe issues relating to polyaniline solubility in organic solvents, see, e.g. Guo et al., The Proceeding of International Conference On Science and Technology of Synthetic Metal, Jul. 12-18, 1998, Montpellier, France; Genies et al., Synth. Met. 36, (1989) 139; Nguyen et al., Macro., 27 (1994) 3625; Mangelopoulos et al., Sci Technol. B. 11 (1993) 2794; Osaheni et al. J. Phys. Chem. 96 (1992) 2830; Bergeron et al., J. Chem. Soc. Chem. Commun. (1990) 180; Osamu et al., Japanese J. of Appl. Phys. Vol 30, No. 4A, April (1991) 653; Angelopoulos et al., Synth. Met., 21 (1987) 21; Tzou et al., Polym. Prepr. 35 (1994) 245; Han et al., U.S. Pat. No. 5,278,213; and Wrobleski et al., Polym. Prepr., 35(1), (1994), 267.

Embodiments of the invention address such solubility problems by providing a process for making polyaniline compositions having new material properties as well as polyaniline compositions made by this process. We report a process for the synthesis of polyaniline that produces a material that is stable in NMP solution up to 18 wt % without the use of any co-solvent additives. The increased solubility (e.g. in NMP) of the polyaniline material disclosed herein facilitates processes for the formation of polyaniline ultrafiltration membranes, for example phase inversion processes that typically would utilize polyaniline concentrations in excess of 15 wt %. Consequently, polyaniline compositions having these material properties can be used in a wider variety of processes than polyaniline compositions formed by conventional techniques.

The room temperature synthesis of polyaniline using APS has been shown to produce nanofibers of controlled diameters when the acid and conditions for nucleation are controlled (see, e.g. J. Huang et al., Am. Chem. Soc. 2004, 126(3): 851-5). Li et al. have shown that nanofibers are formed early during the chemical polymerization of aniline and that minor modifications of these conditions has a drastic impact on the morphology and dispersability of the resultant material (Li et al., Accounts of Chemical Research 2009, 42(1): 135-45). Controlling the rate of oxidant addition and the reaction temperature can influence the structural regularity and molecular weight of the resultant polymer (see, e.g. Adams et al., Polymer 37, 3411 (1996)).

As disclosed herein, we have unexpectedly produced a high defect density polyaniline, one that resists gel formation in NMP. This polyaniline composition is made by rapid addition of the oxidant at room temperature followed by intentional disruption of the nucleation process by stirring for 1 hour. The solubility of this composition in solvents such as NMP is significant, as previous reports and our own experience with polyaniline has shown that polyaniline solutions in NMP gel at concentrations as low as 5%, and always forms a gel at concentrations higher than 10 wt %. This gel formation by polyaniline at these relatively low concentrations is attributed to strong hydrogen bonding interactions between the amine and imine nitrogens on neighboring polymer chains as polymer chains are more closely disposed to one another in concentrated solutions (see, e.g. Yang et al., Synthetic Metals 1999, 101(1-3): 746-749). In this context, without being bound by a specific scientific theory or principle, we hypothesize that the high defect density polyaniline chains that are produced by the processes disclosed herein are unable to pack as closely to one another, thereby preventing the interchain hydrogen bonding interactions from reaching a critical stage where the fluidity of the system is lost and the gel formation process is irreversible. Mixed-matrix membrane pore-structure, morphology, hydrophilicity, and separation performance were compared to identically-formed pure polysulfone membranes.

Illustrative Methods and Materials

Ammonium peroxydisulfate (APS) (Prod. No. A682, ACS grade, ≥98.0%), acetone (Prod. No. 268310010, HPLC grade, ≥99.8%), and sodium hydroxide (Prod. No. S612) were purchased from Fisher. Aniline (Prod. No. 10400, ACS grade, ≥99.5%), sulfuric acid (Prod. No. 320501, ACS grade, 95.0-98.0%), methanol (Prod. No. 179957, laboratory grade, ≥99.6%), potassium bromide (Prod. No. 221864, FT-IR grade, ≥99%), polysulfone beads (Prod. No. 182443, $M_n$~22 kDa), bovine serum albumin (BSA) (Prod. No. A9647, ≥96%), and 1-methyl-2-pyrrolidinone (NMP) (Prod. No. 442778, ACS grade, ≥99.0%) were purchased from Aldrich. Silica nanoparticles (SNOWTEX-20L) were purchased from Nissan Chemical Corp. All materials were used as received.

Polyaniline Synthesis and Characterization

Polyaniline was formed from aniline via chemical oxidative polymerization (see, e.g. H. Letheby, J. Chem. Soc., 1862, 15, 161-163, Mohilner et al., J. Am. Chem. Soc., 1962, 84, 3618-&, Genies et al., Synth. Met., 1990, 36, 139-182, and Macdiamid et al., Synth. Met., 1987, 18, 285-290). An oxidant solution composed of APS dissolved in aqueous $H_2SO_4$ was mixed with a monomer solution composed of aniline dissolved in aqueous $H_2SO_4$. The mixture was rapidly stirred to evenly distribute oxidant and monomer prior to polymerization. Stirring was ceased after 1 h, and the mixture was left standing overnight. Polyaniline was recovered by filtration (0.45 μm Durapore® membrane, Millipore) and washed with sodium hydroxide followed by deionized water and methanol.

Synthesized polyaniline was prepared for SEM analysis by adding 1000 mg/l PANi into 1 M sulfuric acid. The mixture was then sonicated for 10 s. A drop was placed on a clean (water, methanol, acetone, methanol, water rinse) silicon wafer attached by carbon tape to an SEM stub. The droplet was placed in a desiccator under vacuum overnight to evaporate. Residual liquid was removed by placing the stub in an oven at 50° C. for 2 h. The sample was not coated with gold because it was made electrically conductive by acid doping. Polymer molecular weight was determined by gel permeation chromatography.

Membrane Formation and Characterization

Polymer solutions were prepared with polyaniline:polysulfone weight ratios of 1:0 (pure polyaniline), 3:1, 1:1, 1:3, and 0:1 (pure polysulfone). The total polymer concentration was 18 wt % in all cases. Films were cast on a commercial nonwoven polyester support fabric (NanoH$_2$O Inc., Los Angeles, Calif.) and immersed in deionized water at room temperature to induce precipitation. The casting blade height was 152 μm. Polysulfone (PSf) was chosen as a copolymer because it has been well-studied as a filtration membrane material (see, e.g. M. Mulder, Basic principles of membrane technology. 2nd Edition ed. 2003, Dordrecht, The Netherlands: Kluwer Academic Publishers).

Permeability and rejection tests were conducted in a dead-end flow cell (HP4750 Stirred Cell, Sterlitech Corp.) using 4 cm diameter membrane samples. Membrane water permeability was determined for each composite membrane by measuring water volumetric flux at pressures ranging from 5-20 psi. The following expression relates water flux ($J_p$) to pressure drop ($\Delta p$) via a permeability coefficient ($L_p$):

$$J_v = L_p \Delta p = \frac{\varepsilon d_p^2}{32\ \mu l}\Delta p, \quad (1)$$

where $\varepsilon$ is the membrane porosity, $d_p$ is the membrane pore diameter, μ is the liquid dynamic viscosity, and l is the membrane thickness (see, e.g. M. Cheryan, Ultrafiltration and microfiltration handbook. 1998, Lancaster, Pa.: Technomic Publishing Company, Inc). If the membrane is asymmetric (integrally skinned), then $\varepsilon$ is surface porosity, l is the membrane skin thickness, and $\Delta p$ is the pressure drop across the skin layer. Silica nanoparticles and BSA were used to evaluate the membrane separation performance. The nanoparticle concentration was measured using a turbidimeter (Z100AN, Hach Company). A UV-vis spectrophotometer (Lambda 20, Perkin Elmer) was used to determine the BSA concentration. Solute particle rejection (r) was calculated by the following equation:

$$r = 1 - \frac{c_p}{c_f}, \quad (2)$$

where $c_p$ and $c_f$ are solute particle concentrations in the permeate and feed streams, respectively. Dynamic light scattering (ZetaPALS, Brookhaven) confirmed that BSA and silica nanoparticles had diameters of 6 nm and 48 nm, respectively. Membrane pore size can be approximated from solute particle rejection by using the following relationship:

$$r = 1 - 2(1-\lambda)^2 + (1-\lambda)^4, \quad (3)$$

where $\lambda = d_s/d_p$; $d_s$ and $d_p$ are solute particle diameter and membrane pore diameter, respectively.

Membrane samples were prepared for SEM (Nova 600 NanoLab DualBeam™ SEM/FIB, FEI Company) analysis by soaking in pH 1 $H_2SO_4$ solutions for 1 h and drying overnight in a desiccator. Membranes containing some polyaniline were made electrically conductive by doping, so surface coating (by gold, palladium, platinum, etc.) prior to imaging was unnecessary. Pure polysulfone membranes were sputter-coated with gold to prevent charging. Membrane cross-sections were prepared by freeze fracturing using liquid nitrogen. Membrane surface milling was achieved by a focused ion beam (FIB) operated using a gallium source at a current of 10 nA, accelerating voltage of 30 kV, and a magnification of 5,000×.

Figure 9:
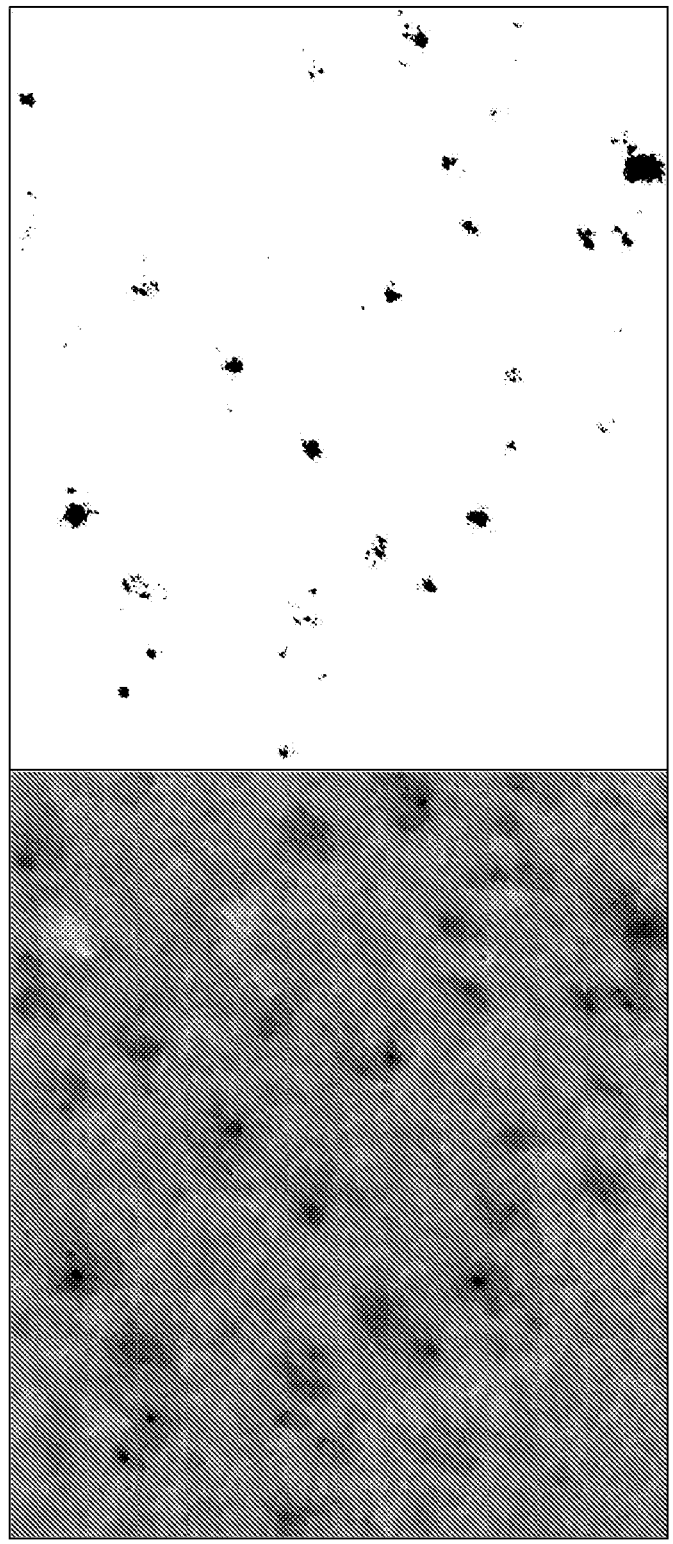
FIG. 9 shows a grey-scale SEM surface image of PANi membrane (left) converted to black and white image (right) to determine membrane pore size and porosity.

Membrane pore size and surface porosity were determined by image analyses of scanning electron micrographs using NIH ImageJ software. High magnification grey-scale surface images were converted to black and white images (FIG. 9) following a previously described procedure (see, e.g. Kang et al., J. Membr. Sci., 2004, 244, 151-165). Surface porosity was calculated by dividing the sum of the black pixels ($A_{black}$) by the total pixels in an image. Average pore diameter ($d_{p,arg}$) was calculated by the following:

$$d_{p,avg} = \sqrt{\frac{4A_{black}}{n\pi}}, \quad (4)$$

where n is the number of continuous dark areas (pores) counted by the software. Maximum pore diameter ($d_{p,max}$) was measured by hand using ImageJ.

Membrane surface roughness was measured using atomic force microscopy (AFM) (Synergy ESPM 3-D, Novascan). Air-dried membranes were scanned in tapping mode in 500 nm×500 nm sections. Water contact angles were measured using a goniometer (DSA10, Krüss). The captive bubble technique was employed here rather than the sessile drop technique due to the porous and hydrophilic nature of pure polyaniline films. Ten drops were measured for each membrane with the highest and lowest values being discarded. Surface roughness-corrected free energy of cohesion ($-\Delta G_{131}$) was calculated as previously described using a water surface tension value of 72.8 mJ·m$^{-2}$ (see, e.g. Ghosh et al., J. Membr. Sci., 2008, 311, 34-45). Fourier transform infrared (FTIR) (FT/IR-420, JASCO) spectra were measured for each polymer composite. Films were cast without a polyester support fabric and dried. Dry films and KBr were then ground into fine powders using a mortar and pestle and pressed into pellets for FTIR analysis.

Figure 10:
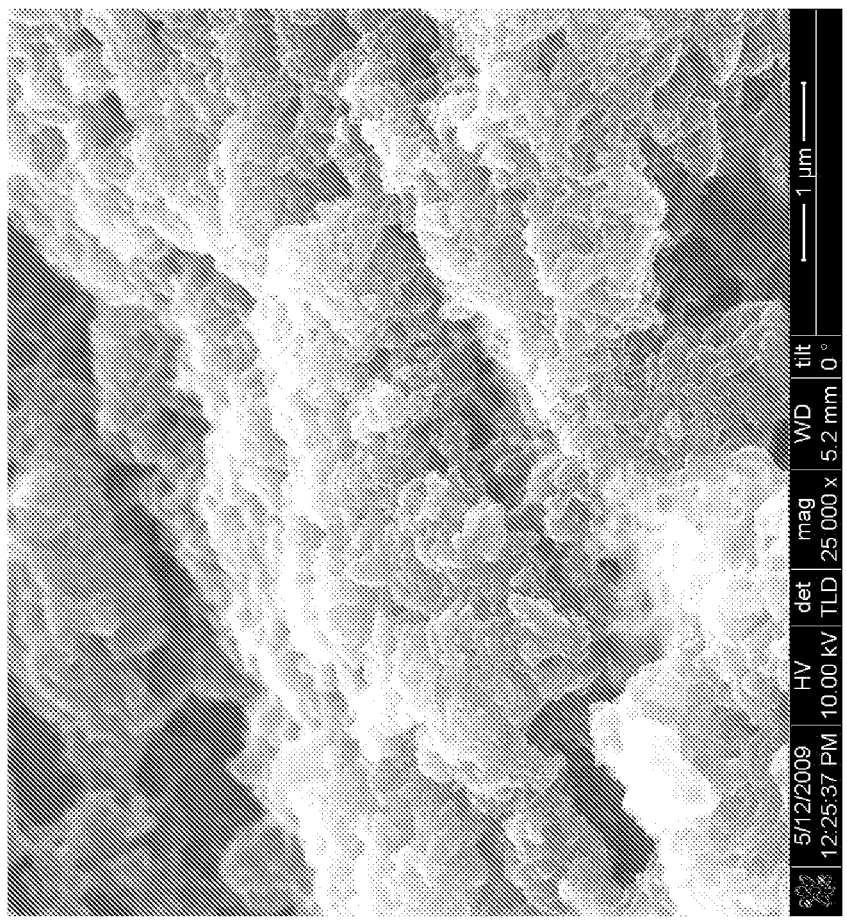
FIG. 10 shows an SEM image of agglomerated PANi.
Figure 11:
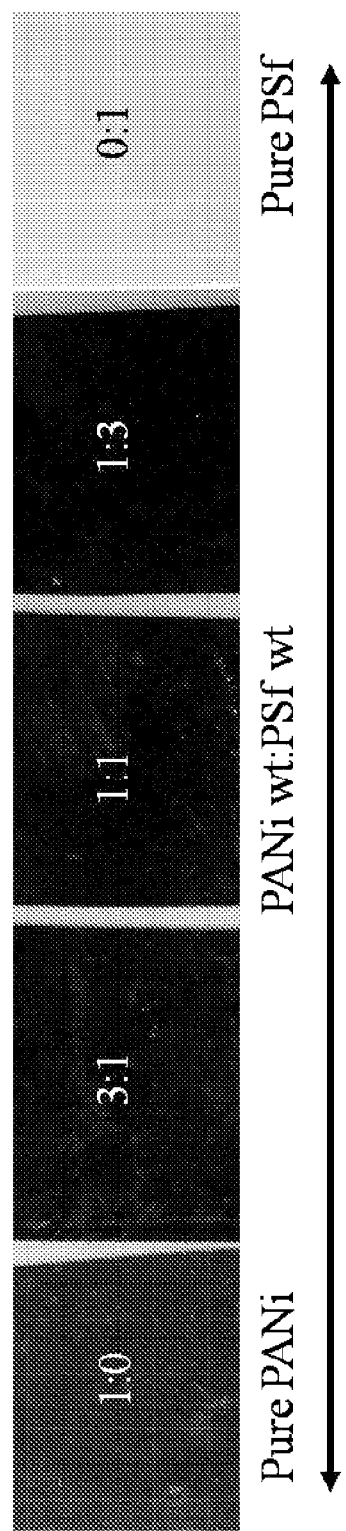
FIG. 11 shows SEM images of membranes of varying polyaniline and polysulfone content formed using the immersion precipitation technique.

A scanning electron micrograph (FIG. 10) reveals that polyaniline synthesized following the method described above produces an agglomerated polymer structure. Polymer dispersions with agglomerated polyaniline weight fractions as high as 18% in NMP have been created and found to be stable for over a week (i.e. the polymer dispersions will not precipitate or form a gel for at least a week). Membranes of varying polyaniline and polysulfone content were formed using the immersion precipitation technique. Images of each membrane are shown in FIG. 11.

Figure 12:
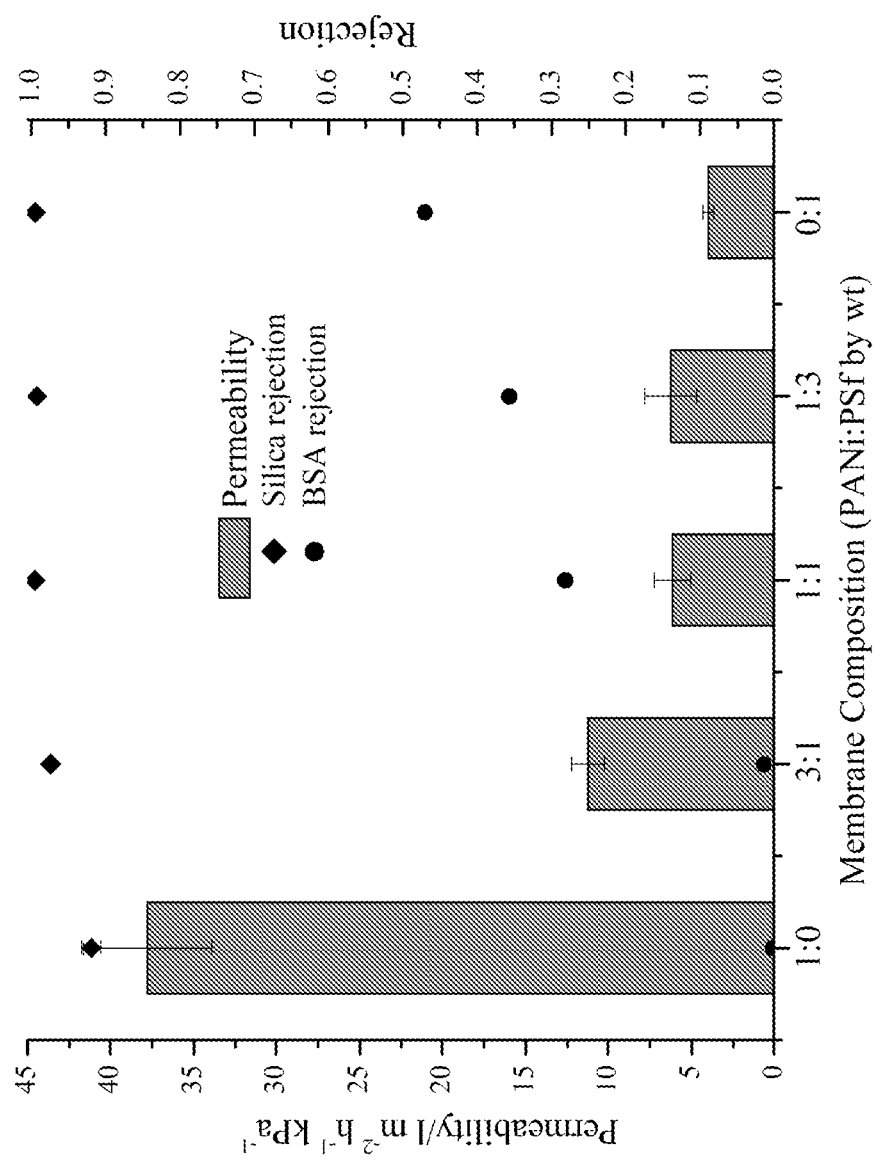
FIG. 12 shows a graph of pure water permeability plus silica nanoparticle and BSA rejection for PANi-PSf composite membranes.

Water permeability and nanoparticle and protein rejection were measured for polyaniline-polysulfone composite membranes. Membrane performance results are shown in FIG. 12. Pure polyaniline membranes are an order of magnitude more permeable than pure polysulfone and composite membranes, i.e., there is a sharp decrease in permeability when polysulfone is introduced. Membranes have comparable rejection for 48 nm silica particles. Membranes containing large fractions of polyaniline showed little or no BSA rejection, while the pure polysulfone membrane showed greater than 45% BSA rejection.

Figure 13:
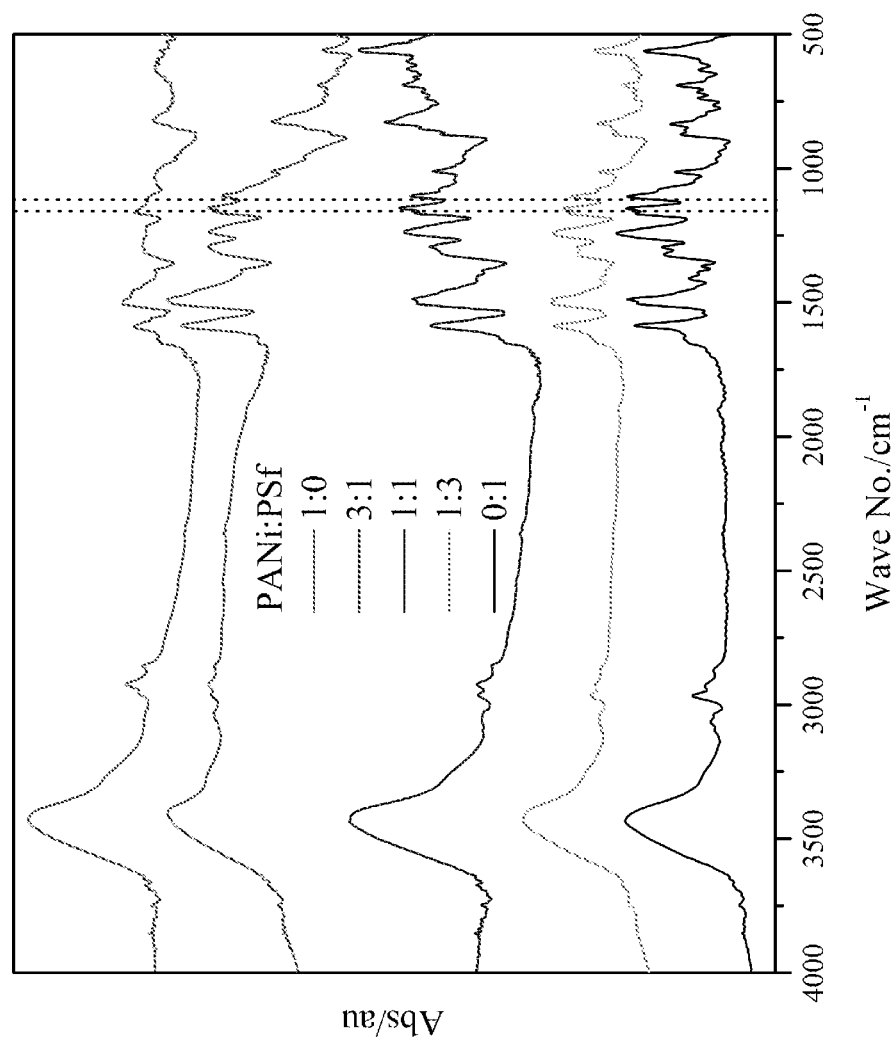
FIG. 13 shows FTIR spectra for polyaniline-polysulfone blend membranes.

Fourier transform infrared analyses were performed for each polymer composite. Spectra are shown in FIG. 13. Sulfones and secondary aromatic amines both have strong absorption bands at 1350-1300 cm$^{-1}$. Sulfones also have an absorption band at 1160-1120 cm$^{-1}$ (see, e.g. Silverstein, G. C. Bassler and T. C. Merrill, Chpt. 3—infrared spectroscopy, in Spectrometric identification of organic compounds. 1991, John Wiley & Sons, Inc.: New York. p. 91-164). This peak (highlighted in FIG. 13) diminishes as the polysulfone content decreases in each composite membrane.

Atomic force microscopy was used to measure surface roughness for each composite membrane. Roughness data are presented in Table 6. Average roughness (Ra) and root mean squared roughness (RMS) values are similar for all composite membranes. The surface area difference (SAD), which is the difference in actual membrane surface area and planar area, is lowest for the pure polysulfone membrane. The surface area difference increases with increasing polyaniline content until a maximum SAD is reached for the 1:1 PANi:PSf composite membrane, beyond which SAD decreases with increasing polyaniline content.

TABLE 6

AFM Surface roughness data and pore model for various polyaniline-polysulfone blended membranes.

| PANi:PSf | RMS (nm) | Ra (nm) | Rmax (nm) | SAD (%) | r-pore (nm) | max r-pore (nm) | ε |
|---|---|---|---|---|---|---|---|
| 1:0 | 5.6 | 4.1 | 47.2 | 16.4 | 8.14 ± 11.27 | 94.37 | 8.2% |
| 3:1 | 3.8 | 3.0 | 30.7 | 37.8 | 6.03 ± 7.59 | 61.31 | 18.9% |
| 1:1 | 4.6 | 3.7 | 35.9 | 85.3 | 7.37 ± 9.27 | 71.71 | 42.7% |
| 1:3 | 2.8 | 2.1 | 27.4 | 24.9 | 4.21 ± 5.55 | 54.84 | 12.5% |
| 0:1 | 5.4 | 4.1 | 40.6 | 6.6 | 8.20 ± 10.83 | 81.25 | 3.3% |

Captive bubble contact angles were measured using deionized water on all composite membranes. Contact angle values and surface energies for each membrane composition are given in Table 7. As expected, the pure polysulfone membrane is the most hydrophobic, and membrane hydrophilicity generally increases with increasing polyaniline content. When surface roughness is considered, the free energy of cohesion for the 1:1 PANi:PSf membrane approaches that of the hydrophobic pure polysulfone membrane.

TABLE 7

Water contact angles and surface roughness-corrected free energies of cohesion for polyaniline-polysulfone blend membranes.

| PANi:PSf | Contact Angle | $-\Delta G_{131}$/mJ m$^{-2}$ |
|---|---|---|
| 1:0 | 24.2° ± 2.1° | 129.8 |
| 3:1 | 25.3° ± 2.1° | 120.6 |
| 1:1 | 32.0° ± 3.3° | 106.1 |
| 1:3 | 43.0° ± 4.7° | 115.5 |
| 0:1 | 64.7° ± 3.8° | 102.0 |

Figure 14:
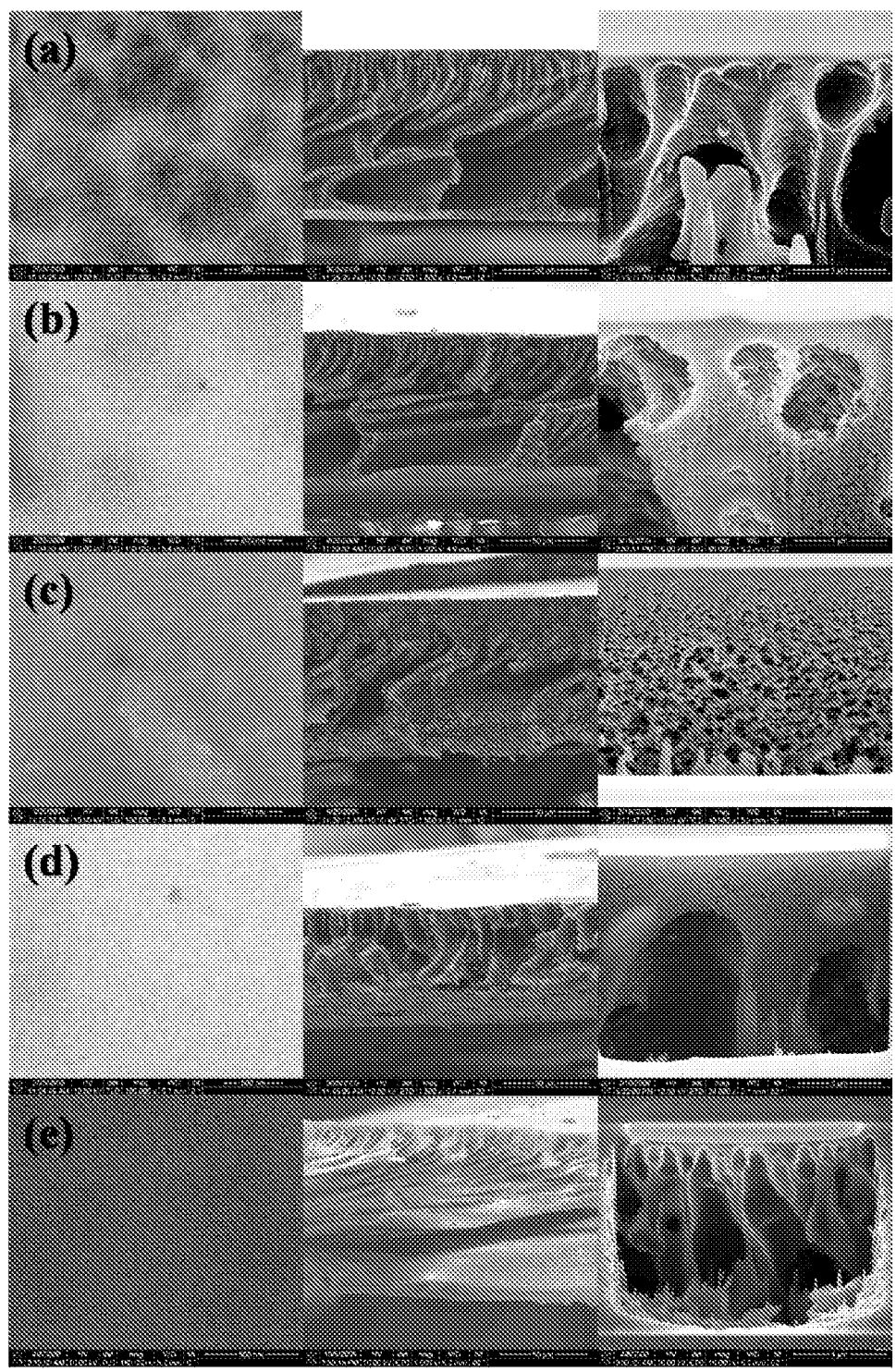
FIG. 14 shows a SEM Plan view (left), full cross-section (middle), and skin layer (right) SEM images of $H_2SO_4$ doped PANi-PSf blend membranes. Membranes are composed of PANi:PSf ratios of a) 1:0, b) 3:1, c) 1:1, d) 1:3, and e) 0:1 (gold-coated).

Scanning electron micrographs (SEM) were taken for each composite membrane (FIG. 14). Images show varied membrane morphology based on polymer composition. Cross-sectional SEM images of the composite membranes reveal that surface skin layers are thinnest for the pure polymer membranes (1:0 and 0:1), thickest for the equal polymer blend membrane (1:1), and of intermediate thickness for the other blend membranes (3:1 and 1:3). Pure polyaniline (PANi) and polysulfone (PSf) membranes have a more open structure with many large, finger-like macrovoids. The 3:1 and 1:3 PANi:PSf composite membranes have fewer finger-like macrovoids. The 1:1 PANi:PSf membrane has a sponge-like substructure with few macrovoids.

Figure 15:
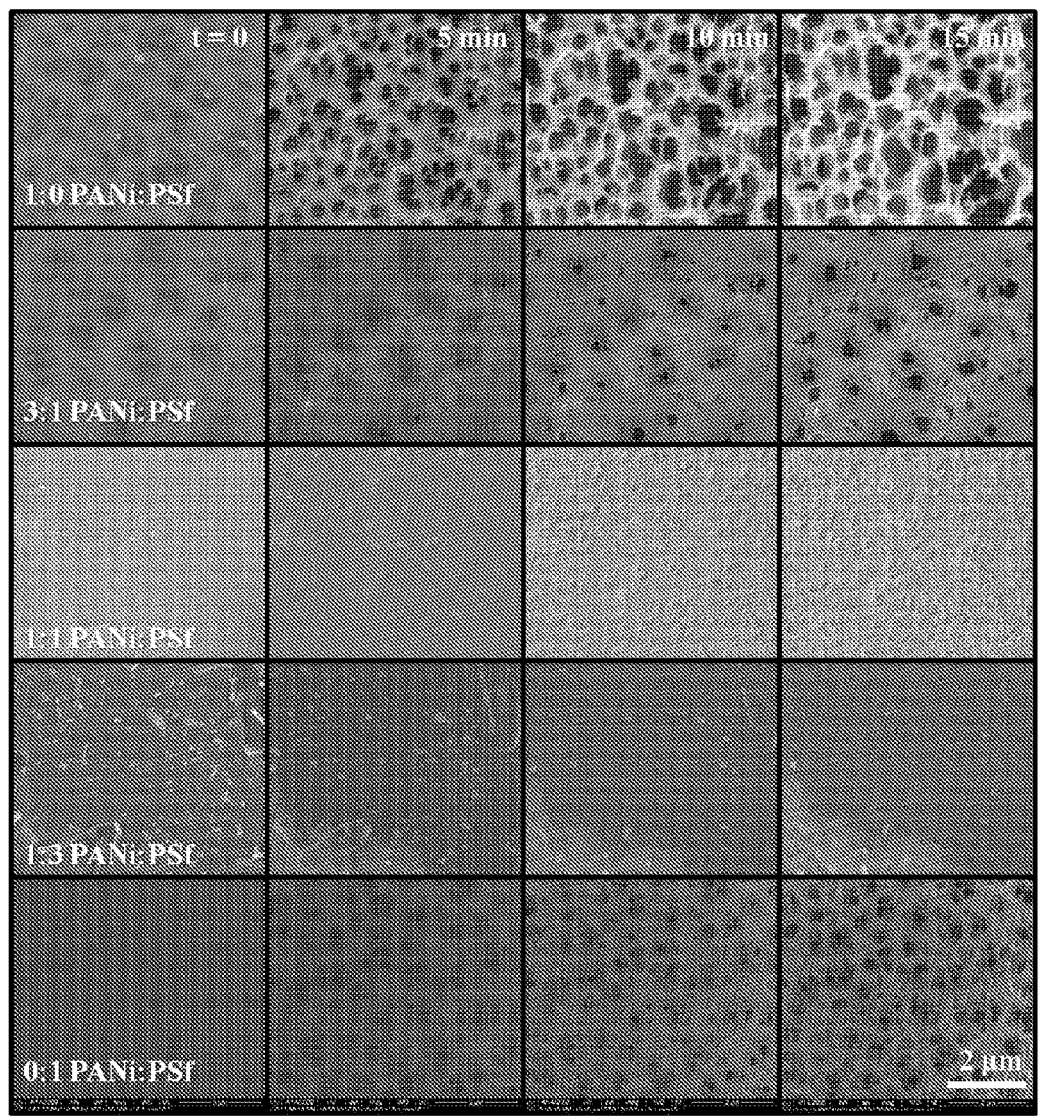
FIG. 15 shows a SEM Plan view time sequence SEM images of PANi-PSf blend membranes exposed to a focused ion beam.

Scanning electron micrographs were taken while simultaneously exposing composite membrane surfaces to a focused ion beam (FIB). The FIB removes surface material by bombarding the surface with gallium ions. Time step images in FIG. 15 show varied membrane surface resistance to the FIB due to some combination of membrane chemical composition and skin layer thickness. Membrane pore size can be calculated using silica nanoparticle and BSA rejection data and Eq. 3. Approximate pore diameters for each membrane are shown in Table 8.

TABLE 8

Membrane pore diameter, surface porosity, and effective pore length approximated from membrane
water permeability, silica nanoparticle rejection, BSA rejection, and SEM image analyses.

| PANi:PSf | Membrane Performance $L_p$/lm$^{-2}$ h$^{-1}$ kPa$^{-1}$ | $r_{NP}$ | $r_{BSA}$ | Solute Rejection $d_p$/nm via $r_{NP}$ | $d_p$/nm via $r_{BSA}$ | $\epsilon l^{-1}$/nm$^{-1}$ | SEM Image Analysis $d_{p,avg}$/ nm | $d_{p,max}$/ nm | $\epsilon$ | $l$/nm | $\epsilon l^{-1}$/nm$^{-1}$ |
|---|---|---|---|---|---|---|---|---|---|---|---|
| 1:0 | 37.8 | 92% | 0% | 60 | >6 | $9.3 \times 10^{-5}$ | 11.1 | 41.8 | 2.1% | 7.8 | $2.7 \times 10^{-3}$ |
| 3:1 | 11.2 | 97% | 1% | 54 | >6 | $3.4 \times 10^{-5}$ | 7.0 | 20.0 | 4.6% | 22.7 | $2.0 \times 10^{-3}$ |
| 1:1 | 6.2 | >99% | 28% | <48 | 19 | $1.5 \times 10^{-4}$ | 4.8 | 25.1 | 1.7% | 7.1 | $2.4 \times 10^{-3}$ |
| 1:3 | 6.2 | >99% | 36% | <48 | 16 | $2.1 \times 10^{-4}$ | 5.8 | 22.9 | 1.8% | 10.6 | $1.7 \times 10^{-3}$ |
| 0:1 | 4.0 | >99% | 47% | <48 | 14 | $1.9 \times 10^{-4}$ | 4.7 | 22.6 | 4.8% | 30.5 | $1.6 \times 10^{-3}$ |

Partial silica nanoparticle rejection ($r_{NP}$) by the pure polyaniline membrane translates into an average pore diameter of 60 nm, classifying this membrane as a "loose" ultrafiltration membrane. Complete nanoparticle rejection, however, gives an incomplete picture of membrane pore diameter; pore diameter is less than the particle diameter. Partial BSA rejection indicates that the pure polysulfone membrane is a mid-range ultrafiltration membrane with an average pore diameter of 14 nm.

Membrane average pore diameter, maximum pore diameter, and surface porosity were approximated by analyzing surface SEM images of composite membranes (Table 8). Average membrane pore diameters ranging from 5-11 nm were found for composite polyaniline-polysulfone membranes. Pore diameter was found to decrease with increasing polysulfone content. Maximum observed pore diameters were typically 3-5 times greater than average pore diameters for each membrane, which may have affected solute rejection and permeability. Surface porosity ranged from 2-5%, and did not follow a noticeable trend with relative polymer content. Effective pore length was calculated using Eq. 1 and was found to generally increase with increasing polysulfone content.

Polyaniline Characteristics

Figure 8:
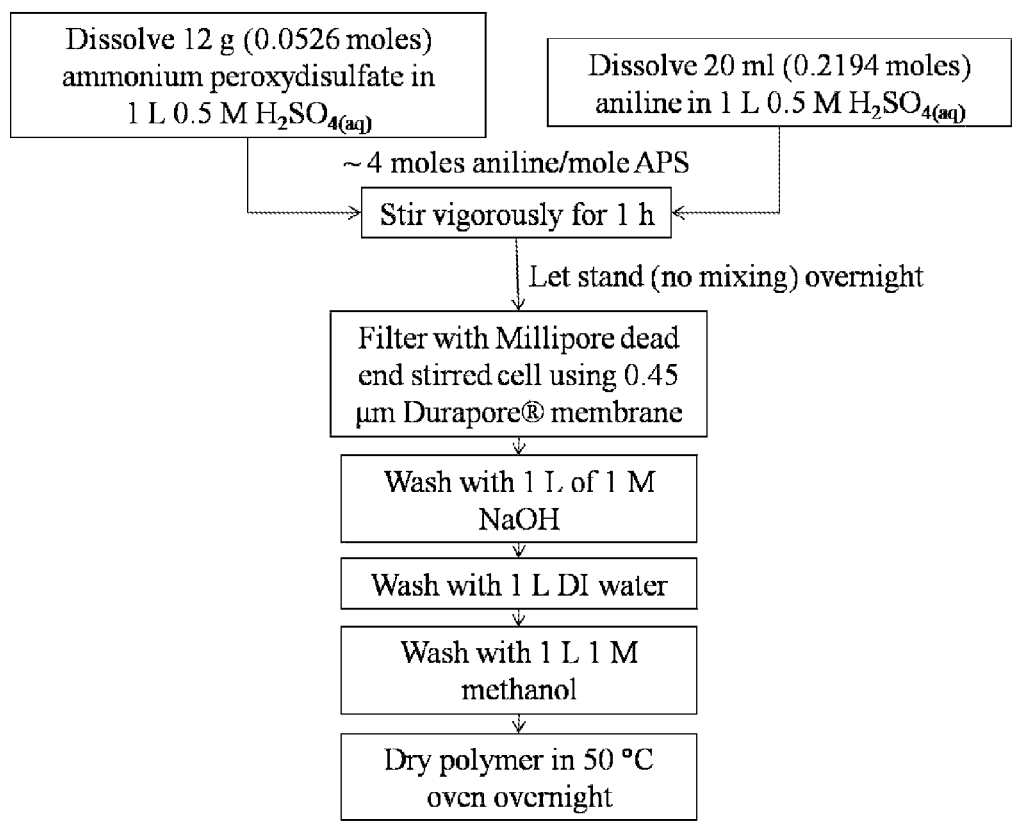
FIG. 8 provides a flow chart of a polyaniline synthesis procedure of Example 1.

The synthesis outlined in FIG. 8 was initially expected to form polyaniline nanofibers, fibers that are formed early during chemical polymerization (see, e.g. Li et al., Acc. Chem. Res., 2009, 42, 135-145). Unexpectedly however, SEM images clearly show that an agglomerated form of the polymer is produced. Without being bound by a specific scientific theory or mechanism, secondary polymer growth in this synthesis procedure likely occurs during the 1 hour rapid mixing step, which results in the production of agglomerates rather than discrete nanofibers. A critical difference between the nanofibrous polyaniline described in the art and the agglomerated polyaniline produced by these methods is its processability. In particular, as is known in the prior art, dispersions of polyaniline formed from conventional polymerization processes instantly form a gel at polymer weight fractions above 10% in NMP. In contrast, polymer dispersions of the agglomerated polyaniline compositions made by the methods disclosed here are stable at weight fractions up to 18% in NMP (i.e. an almost 2 fold higher concentration). The ability of the polyaniline compositions made by the methods disclosed here to be are at weight fractions up to 18% in NMP facilitates its processing, for example by providing a higher concentration of polyaniline in NMP than has previously been attainable. Consequently such compositions are useful for example in methods for making membranes from such polymeric compositions (e.g. due to the compositions' ability to be readily cast as films by phase inversion techniques).

Membrane Morphology and Structure

According to the Hagen-Poiseuille model for flow through a porous membrane, membrane permeability is proportional to the square of the membrane pore diameter. Pore diameters calculated from silica and BSA rejection over-predict the difference in water permeability between the pure polyaniline and polysulfone membranes [$L_{p,1:0}/L_{p,0:1}$=9.5; $(d_{p,1:0}/d_{p,0:1})^2$=19]. The pure polyaniline membrane $\epsilon l^{-1}$ factor is half that of the pure polysulfone membrane. Using solute particle rejection data to describe membrane pore size has a few limitations, however. Fouling of the membrane due to solute-membrane interactions may cause higher solute rejection, which can result in the calculation of a smaller pore diameter. Solutes such as BSA may deform when under stress and can squeeze through pores smaller than their hydrodynamic radii, which can result in the calculation of a larger pore diameter. Membrane porosity and pore length cannot be independently determined from such an analysis. Several other factors may also play a role in membrane performance and morphology. Membrane hydrophilicity is known to affect membrane performance. An increase in polyaniline content leads to an increase in membrane hydrophilicity and may be partially responsible for the increased water permeability. These effects cannot be quantified from the simple size based permeability model.

Average membrane pore diameters determined from analysis of SEM surface images were smaller than those determined from solute particle rejection. However, maximum observed pore diameters were similar in value to those calculated from solute particle rejection. A few larger pores may have had a large influence on solute particle retention by the membranes. An advantage of SEM image analysis is the ability to quantify membrane surface porosity. Pure polysulfone average membrane pore diameter is less than half that of the pure polyaniline membrane, but the surface porosity is more than twice that of the pure polyaniline membrane. Pure polyaniline membrane permeability, however, is 9.5 times greater than pure polysulfone membrane permeability. Differences in pore diameter, porosity, and effective pore area ($\epsilon d_p^2$) do not explain the difference in membrane permeability between pure polyaniline and pure polysulfone membranes [$L_{p,1:0}/L_{p,0:1}$=9.5; $(d_{pore,1:0}/d_{pore,0:1})^2$=5.5; $\epsilon_{1:0}/\epsilon_{0:1}$=0.44; $\epsilon_{1:0}/\epsilon_{0:1} \cdot (d_{pore,1:0}/d_{pore,0:1})^2$=2.4]. Using the effective pore (l) length as a fitting parameter for membrane permeabilities produces the values of l given in Table 8. The characteristic polysulfone membrane effective pore length was nearly 4 times longer than that of the pure PANi membranes; thus, providing a mechanistic, membrane structure-based explanation for the much higher flux of PANi membranes.

Surface SEM images (FIG. 14) show dark regions in the pure polyaniline membrane, which appear to be macrovoids under a thin, semi-transparent skin layer. These features are easily visible as dark regions in the pure polyaniline membrane surface image and are visible, but less pronounced, in pure polysulfone and 3:1 PANi:PSf membranes. Macrovoids are not visible in the surface SEM images of 1:1 and 1:3 PANi:PSf composite membranes. The macrovoids visible in the pure polyaniline membranes appear in clusters and display some spatial ordering. Full SEM cross-sections reveal that each membrane has finger-like macrovoids. The 1:1 composite membrane is an exception as it appears to have a mixture of sponge-like and finger-like morphology.

Membrane skin layer thickness was analyzed from the time-step FIB-SEM images. An obvious limitation to this analysis lies in the assumption that each polymer has similar physical/thermal resistance to the FIB, whereby skin layer thickness is proportional to erosion time. The pure polyaniline membrane had the shortest erosion time (thinnest skin layer) of the composite membranes. The majority of the skin layer was removed after only 5 min. The pure polysulfone and 3:1 PANi:PSf membrane showed marked erosion near the 10 min mark indicating that their skin layers are thinner than those of the 1:1 and 1:3 PANi:PSf membranes. These results mirror the results of the skin layer SEM images. The FIB-SEM images allow for positive identification of macrovoids under the thin, transparent skin layers of the pure polyaniline, pure polysulfone, and 3:1 PANi:PSf membranes. The darker regions visible at t=0 in these membranes become macrovoids after several minutes under the FIB. The 1:1 PANi:PSf membrane shows slight pitting after 10 min, which may be the exposed sponge-like sublayer. The 1:3 PANi:PSf membrane shows very slight pitting only after 15 min of FIB irradiation.

In summary, by modifying an existing method for synthesizing the conducting polymer polyaniline, a more processable polymer has been formed. Pure polyaniline ultrafiltration membranes show high water permeability and particle rejection, which may be due to their hydrophilicity and relatively thin skin layer. The addition of polysulfone to polyaniline membranes reduces water permeability but increases particle and protein rejection and membrane structure is dramatically affected by polymer composition for polyaniline-polysulfone composites.

The invention claimed is:

1. A filtration membrane comprising from about 25% to 100% by weight of a high defect density polyaniline polymer
   having an average molecular weight between 1,000 and $1 \times 10^6$ Daltons,
   capable of forming a dispersion at a concentration of at least 11 weight % in a solvent consisting essentially of N-methyl-2-pyrrolidone,
   and having a higher proportion of covalent bonds at the meta and/or ortho position on the aniline rings than (i) a polyaniline polymer formed in an oxidative polymerization reaction in the absence of mechanical force sufficient to disrupt nucleation during the reaction, and (ii) a polyaniline polymer formed in an oxidative polymerization reaction at a temperature below 15° C.

2. The filtration membrane of claim 1, wherein the membrane is formed using a phase inversion process.

3. The filtration membrane of claim 2, wherein the phase inversion process is a thermal phase inversion process.

4. The filtration membrane of claim 2, wherein the phase inversion process is an immersion phase inversion process.

5. A method of making the filtration membrane of claim 1, the method comprising:
   combining aniline monomers and an aniline polymer initiator together in a single step so as to form an oxidative polymerization reaction; and
   subjecting the oxidative polymerization reaction to a mechanical force during the oxidative polymerization reaction, wherein the mechanical force is sufficient to disrupt a nucleation process of a polyaniline polymer formed by the oxidative polymerization reaction.

6. The method of claim 5, wherein the oxidative polymerization reaction is conducted at room temperature.

7. The method of claim 6, wherein the oxidative polymerization reaction forms polyaniline polymers having a decreased ability to form interchain hydrogen bonding interactions in a solvent.

8. The method of claim 5, wherein the aniline polymer initiator is a polyaniline oxidizing agent.

9. The method of claim 5, wherein subjecting the oxidative polymerization reaction to the mechanical force comprises stirring the oxidative polymerization reaction for at least one hour after the oxidative polymerization reaction is initiated.

10. The method of claim 5, wherein the oxidative polymerization reaction is conducted at a temperature between 20 and 25 degrees centigrade.

11. The filtration membrane of claim 1, wherein the filtration membrane further comprises a polysulfone polymer in an amount from about 25% to about 75% by weight.

12. The filtration membrane of claim 11, wherein the polysulfone polymer has an average molecular weight of between 1,000 and $1 \times 10^6$ Daltons.

13. The filtration membrane of claim 1, wherein the filtration membrane further comprises:
   a hydrophilic agent; or
   a doping agent.

14. The filtration membrane of claim 1, wherein the high defect density polyaniline polymer forms a dispersion at a concentration up to 18 weight % in a solvent consisting essentially of N-methyl-2-pyrrolidone.

15. The filtration membrane of claim 1, wherein the high defect density polyaniline polymer forms a dispersion that is stable for over a week.

16. A filtration membrane comprising from about 25% to 100% by weight of a high defect density polyaniline polymer, wherein the high defect density polyaniline polymer is produced by a process comprising the steps of:
   combining aniline monomers and an aniline polymer initiator together in a single step so as to form an oxidative polymerization reaction; and
   subjecting the oxidative polymerization reaction to a mechanical force during the oxidative polymerization reaction, wherein the mechanical force is sufficient to disrupt a nucleation process of a polyaniline polymer formed by the oxidative polymerization reaction,
   wherein
   the high defect density polyaniline polymer has an average molecular weight between 1,000 and $1 \times 10^6$ Daltons;
   the high defect density polyaniline polymer is capable of forming a dispersion at a concentration of at least 11 weight % in a solvent consisting essentially of N-methyl-2-pyrrolidone; and
   the high defect density polyaniline polymer has a higher proportion of covalent bonds at the meta and/or ortho position on the aniline rings than (i) a polyaniline polymer formed in an oxidative polymerization reaction in the absence of mechanical force sufficient to disrupt nucleation during the reaction, and (ii) a polyaniline polymer formed in an oxidative polymerization reaction at a temperature below 15° C.

17. The filtration membrane of claim 16, wherein the oxidative polymerization reaction is conducted at room temperature.

18. The filtration membrane of claim 16, wherein the high defect density polyaniline polymer forms a dispersion at a concentration up to 18 weight % in a solvent consisting essentially of N-methyl-2-pyrrolidone.

19. The filtration membrane of claim 16, wherein the filtration membrane further comprises a polysulfone polymer in an amount from about 25% to about 75% by weight.

20. The filtration membrane of claim 19, wherein the polysulfone polymer has an average molecular weight of between 1,000 and $1 \times 10^6$ Daltons.

* * * * *